(12) United States Patent
Nabki et al.

(10) Patent No.: US 10,743,254 B2
(45) Date of Patent: *Aug. 11, 2020

(54) METHODS AND SYSTEMS RELATING TO ULTRA WIDEBAND BROADCASTING

(71) Applicant: TRANSFERT PLUS SOCIETE EN COMMANDITE, Montreal (CA)

(72) Inventors: Frederic Nabki, Montreal (CA); Dominic Deslandes, Chambly (CA); Alexandre Desmarais, Verdun (CA); Anh-Kiet Vuong, Montreal (CA); Anis Bounif, Montreal (CA); Wang Hao, Montreal (CA); William Pham, Montreal (CA)

(73) Assignee: Transfert Plus, Societe en Commandite, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/715,589

(22) Filed: Dec. 16, 2019

(65) Prior Publication Data
US 2020/0120594 A1 Apr. 16, 2020

Related U.S. Application Data

(63) Continuation of application No. 16/679,838, filed on Nov. 11, 2019, which is a continuation of application
(Continued)

(51) Int. Cl.
*H04W 52/02* (2009.01)
*G06F 3/0488* (2013.01)
(Continued)

(52) U.S. Cl.
CPC .......... *H04W 52/02* (2013.01); *G03B 21/00* (2013.01); *G03B 21/26* (2013.01); *G06F 1/163* (2013.01);
(Continued)

(58) Field of Classification Search
CPC . H04W 52/02; H04B 1/7172; H04B 1/71632; H04B 5/02; H04B 1/713;
(Continued)

(56) References Cited

U.S. PATENT DOCUMENTS

| 2003/0161411 | A1* | 8/2003 | McCorkle | G01S 7/023 375/295 |
| 2004/0233972 | A1* | 11/2004 | Karaoguz | H04B 1/719 375/130 |

(Continued)

*Primary Examiner* — Syed Haider
(74) *Attorney, Agent, or Firm* — Rosenberg, Klein & Lee

(57) ABSTRACT

Within many applications impulse radio based ultra-wideband (IR-UWB) transmission offers significant benefits for very short range high data rate communications when compared with existing standards and protocols. In many of these applications the main design goals are very low power consumption and very low complexity design for easy integration and cost reduction. Digitally programmable IR-UWB transmitters using an on-off keying modulation scheme on a 0.13 microns CMOS process operating on 1.2V supply and yielding power consumption as low as 0.9 mW at a 10 Mbps data rate with dynamic power control are enabled. The IR-UWB transmitters support new frequency hopping techniques providing more efficient spectrum usage and dynamic allocation of the spectrum when transmitting in highly congested frequency bands. Biphasic scrambling is also introduced for spectral line reduction. Additionally, an energy detection receiver for IR-UWB is presented to similarly meet these design goals whilst being adaptable to address IR-UWB transmitter specificity.

24 Claims, 25 Drawing Sheets

Related U.S. Application Data

No. 16/256,540, filed on Jan. 24, 2019, now Pat. No. 10,477,469, which is a continuation of application No. 15/873,308, filed on Jan. 17, 2018, now Pat. No. 10,299,201, which is a continuation of application No. 15/110,489, filed as application No. PCT/CA2015/000007 on Jan. 7, 2015, now Pat. No. 10,009,839.

(60) Provisional application No. 61/925,290, filed on Jan. 9, 2014.

(51) Int. Cl.

| | | |
|---|---|---|
| *G03B 21/26* | (2006.01) | |
| *H04B 1/713* | (2011.01) | |
| *G06F 3/03* | (2006.01) | |
| *G06F 1/16* | (2006.01) | |
| *H04B 1/7163* | (2011.01) | |
| *G06F 3/0482* | (2013.01) | |
| *G06F 3/042* | (2006.01) | |
| *H04B 1/717* | (2011.01) | |
| *G03B 21/00* | (2006.01) | |
| *G06F 3/0484* | (2013.01) | |
| *H04B 5/02* | (2006.01) | |
| *G06F 3/041* | (2006.01) | |
| *G06F 3/048* | (2013.01) | |
| *G06F 3/0346* | (2013.01) | |
| *G06F 3/01* | (2006.01) | |
| *H04N 9/31* | (2006.01) | |
| *H04B 5/00* | (2006.01) | |

(52) U.S. Cl.
CPC ............ *G06F 3/017* (2013.01); *G06F 3/0304* (2013.01); *G06F 3/0346* (2013.01); *G06F 3/041* (2013.01); *G06F 3/042* (2013.01); *G06F 3/048* (2013.01); *G06F 3/0425* (2013.01); *G06F 3/0426* (2013.01); *G06F 3/0482* (2013.01); *G06F 3/0488* (2013.01); *G06F 3/04845* (2013.01); *H04B 1/713* (2013.01); *H04B 1/7172* (2013.01); *H04B 1/71632* (2013.01); *H04B 1/71635* (2013.01); *H04B 5/02* (2013.01); *H04N 9/3194* (2013.01); *G06F 3/04886* (2013.01); *H04B 5/0075* (2013.01); *Y02D 70/00* (2018.01); *Y02D 70/1224* (2018.01); *Y02D 70/1242* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/40* (2018.01); *Y02D 70/42* (2018.01)

(58) Field of Classification Search
CPC ...... H04B 5/0075; G03B 21/00; G03B 21/26; G06F 3/0488; G06F 3/042; G06F 3/041; G06F 1/163; G06F 3/0346; G06F 3/048; G06F 3/0425; G06F 3/0426; G06F 3/04845; G06F 3/0304; G06F 3/017; G06F 3/0482; G06F 3/04886; H04N 9/3194; Y02D 70/146; Y02D 70/142; Y02D 70/144; Y02D 70/40; Y02D 70/164; Y02D 70/1224; Y02D 70/1242; Y02D 70/00; Y02D 70/42; Y02D 70/166
See application file for complete search history.

(56) References Cited

U.S. PATENT DOCUMENTS

| | | | | |
|---|---|---|---|---|
| 2005/0141602 A1* | 6/2005 | Hyun | ............... | H04B 1/7174 375/219 |
| 2005/0276310 A1* | 12/2005 | Choi | ............... | H04B 1/7176 375/130 |
| 2009/0258669 A1* | 10/2009 | Nie | ............... | H04B 1/71637 455/552.1 |
| 2010/0062726 A1* | 3/2010 | Zheng | ............... | H04B 1/40 455/74 |

* cited by examiner

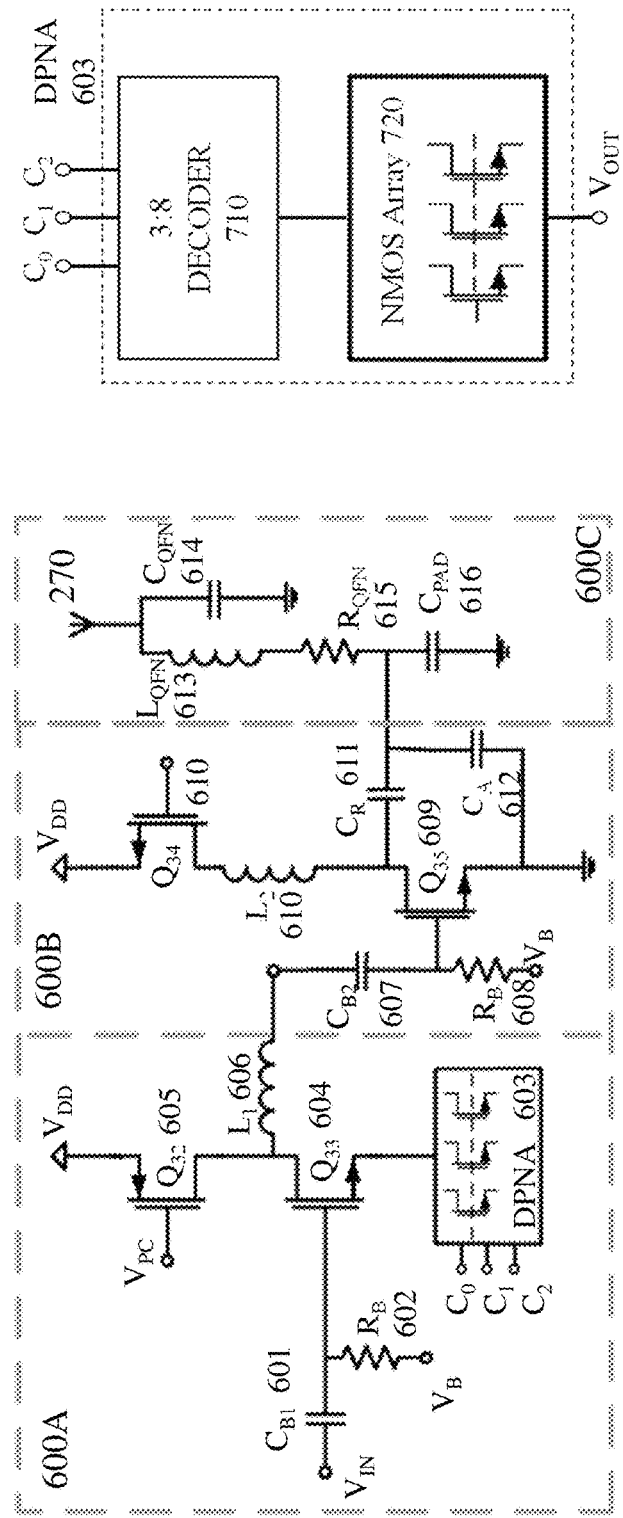
Figure 6
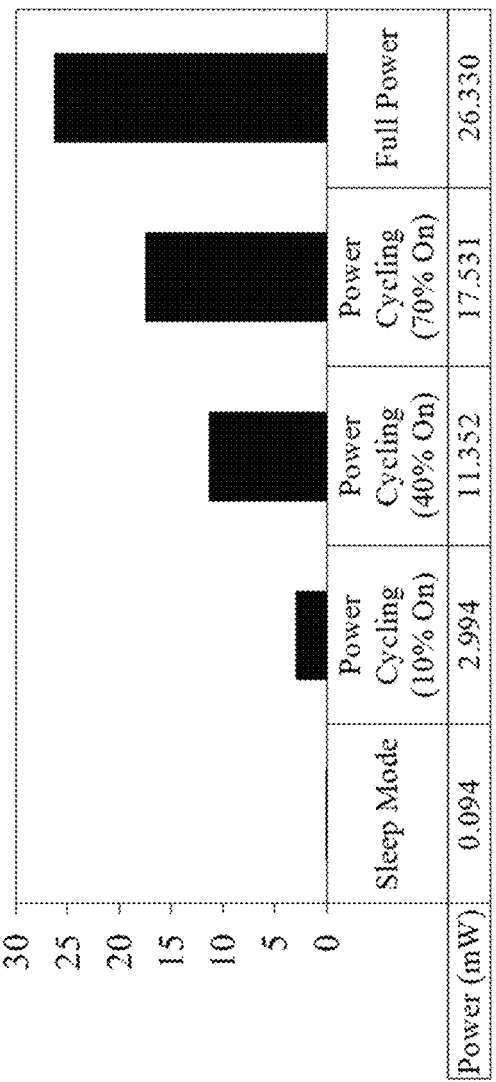
Figure 7
Figure 8A 3140   3130   3120   3110

METHODS AND SYSTEMS RELATING TO ULTRA WIDEBAND BROADCASTING

CROSS-REFERENCE TO RELATED APPLICATIONS

This application claims the benefit as a continuation of U.S. patent application Ser. No. 16/679,838 filed Nov. 11, 2019 which itself claims the benefit of priority from U.S. patent application Ser. No. 16/256,540 filed Jan. 24, 2019, which itself claims the benefit of priority from U.S. patent application Ser. No. 15/873,308 filed Jan. 17, 2018, which itself claims the benefit of priority from U.S. Ser. No. 15/110,489 filed on Jul. 8, 2016, which itself claims the benefit of priority as a 371 National Phase Application of PCT/CA2015/000007 filed Jan. 7, 2015, which itself claims the benefit of U.S. Provisional Patent Application 61/925,290 filed Jan. 9, 2014, the entire contents of all being incorporated herein by reference.

FIELD OF THE INVENTION

This invention relates to ultra wideband wireless communications and more particularly communications systems exploiting mixerless transmitters and energy based receivers.

BACKGROUND OF THE INVENTION

Ultra Wideband (UWB) technology is a wireless technology for the transmission of large amounts of digital data as modulated coded impulses over a very wide frequency spectrum with very low power over a short distance. Such pulse based transmission being an alternative to transmitting using a sinusoidal wave which is then turned on or off, to represent the digital states, as employed within today's wireless communication standards and systems such as IEEE 802.11 (Wi-Fi), IEEE 802.15 wireless personal area networks (PANs), IEEE 802.16 (WiMAX), Universal Mobile Telecommunications System (UMTS), Global System for Mobile Communications (GSM), General Packet Radio Service (GPRS), and those accessing the Industrial, Scientific and Medical (ISM) bands, and International Mobile Telecommunications-2000 (IMT-2000).

UWB was formerly known as "pulse radio", but the Federal Communications Commission (FCC) and the International Telecommunication Union Radiocommunication Sector (ITU-R) currently define UWB in terms of a transmission from an antenna for which the emitted signal bandwidth exceeds the lesser of 500 MHz or 20% of the center frequency. Thus, pulse-based systems where each transmitted pulse occupies the full UWB bandwidth or an aggregate of at least 500 MHz of narrow-band carrier; for example, orthogonal frequency-division multiplexing (OFDM) can gain access to the UWB spectrum under the rules. Pulse repetition rates may be either low or very high. Pulse-based UWB radars and imaging systems tend to use low repetition rates (typically in the range of 1 to 100 megapulses per second). On the other hand, communications systems favor high repetition rates (typically in the range of one to two gigapulses per second), thus enabling short-range gigabit-per-second communications systems. As each pulse in a pulse-based UWB system occupies a large bandwidth, even the entire UWB bandwidth, such systems are relatively immune to multipath fading but not intersymbol interference, unlike carrier modulation based systems which are subject to both deep fading and intersymbol interference (ISI).

Pulse based wireless communication has come a long way since being first allowed by the Federal Communication Commission (FCC). Able to offer either high data rates or very energy efficient transmissions over short ranges, multiple techniques have been developed for ultra-wideband (UWB) communication including multi-band orthogonal frequency division multiplexing (MB-OFDM), impulse radio (IR-UWB) and frequency modulation (FM-UWB) each with its specific strengths. The potential for very low power communications and precise ranging has seen the inclusion of UWB radios in multiple standards aimed for different applications like low-rate wireless personal area networks (WPAN) with IEEE 802.15.4a and more recently wireless body area networks (WBAN) with IEEE 802.15.6.

UWB systems are well-suited to short-distance applications in a variety of environments, such as depicted in FIG. 1 including peripheral and device interconnections, as exemplified by first residential environment 110, sensor networks, as exemplified by second residential environment 120, control and communications, as exemplified by industrial environment 130, medical systems, as exemplified by medical imaging 150, and personal area networks (PAN), as exemplified by PAN 140. Due to low emission levels permitted by regulatory agencies such UWB systems tend to be short-range indoor applications but it would be evident that a variety of other applications may be considered where such regulatory restrictions are relaxed and/or not present addressing military and civilian requirements for communications between individuals, electronic devices, control centers, and electronic systems for example.

Due to the short duration of UWB pulses in principle it is easier to engineer high data rates and data rate may be exchanged for range in many instances by aggregating pulse energy per data bit, with the appropriate integration or coding techniques. In addition UWB supports real-time location systems and tracking (using distance measurements between radios and precision time-of-arrival-based localization approaches) which in addition to its precision capabilities and low power make it well-suited for radio-frequency-sensitive environments, such as many medical environments. An additional feature of UWB is its short broadcast time.

When considering many applications, such as wireless sensor networks and portable electronics, UWB transceivers should ideally be functionally highly integrated for low footprint, support low cost and high volume manufacturing, and be energy efficient in order to run on a limited power source, e.g. a battery, indoor solar cell, small outdoor solar cell, or those developed upon evolving technologies such as thermal gradients, fluid flow, small fuel cells, piezoelectric energy harvesters, micromachined batteries, and power over optical fiber. UWB has been considered for a long time a promising technology for these applications. By using discrete pulses as modulation, it is possible to implement efficient duty cycling scheme while the transmitter is not active, see for example Hamdi et al in "A Low-Power OOK Ultra-Wideband Receiver with Power Cycling" (Proc. IEEE New Circuits and Systems Conference 2011, pp. 430-433), which can be further improved by using an On-Off Shift Keying (OOK) modulation. Further, some UWB operation frequencies, between 3.1 GHz and 10.6 GHz for example as approved by FCC for indoor UWB communication systems, see for example "First Report and Order in the Matter of Revision of Part 15 of the Commission's Rules Regarding Ultra-Wideband Transmission Systems (FCC, ET-Docket 98-153, FCC 02-48), allow for small antennas which can easily be integrated into an overall reduced footprint sensor solution.

In order to generate very short impulses which conform to a power spectrum density (PSD) mask, multiple approaches have been attempted within the prior art, each of which has different strengths and drawbacks. Most work relates to shaping a short numerical impulse by filtering, see for example Jazairli et al in "An Ultra-Low-Power Frequency-Tunable UWB Pulse Generator using 65 nm CMOS Technology," (IEEE Int. Conf. on Ultra-Wideband, 2010, pp. 1-4) and Sim et al in "A CMOS UWB Pulse Generator for 6-10 GHz Applications" (IEEE Microwave and Wireless Components Letters, Vol. 19(2), pp. 83-85), or by using an oscillator and a mixer to up-convert the signal, see for example Y. Zheng et al., "A 0.18 µm CMOS 802.15.4a UWB Transceiver for Communication and Localization" (IEEE Int. Solid-State Circuits Conference, 2008, pp. 118-600). However, short impulse filtering requires bulky passive components and generates a fixed pulse pattern whilst mixing uses an oscillator in conjunction with a mixer with high power consumption but does provide spectrum flexibility.

Within low power systems controlling the transmitted PSD is very important to maximize the spectrum utilization by appropriately shaping the pulses. However, in other applications and operating regimes avoiding certain frequency bands may be a requirement in order to reduce noise and the resulting signal interference either to the UWB signal or other signals. For example, global positioning system (GPS) exploit very low power signals, generally within the noise, at 1575.42 MHz, 1227.60 MHz, 1380.05 MHz, 1379.913 MHz, and 1176.45 MHz for the L1 to L5 bands respectively, see for example "On the UWB System Coexistence with GSM 900, UMTS/WCDMA, and GPS" (IEEE J. Sel. Area in Comms., Vol. 20(9), pp. 1712-1721). Whilst mixing can be used for tuning the center frequency of a transmitter, usually along standardized channels as in IEEE standards, such systems generally use pulses with relatively small bandwidths to separate the channels, and apart from skipping certain center frequencies cannot adaptively adjust their spectral utilisation. Whilst good spectral usage and tunability may be achieved with MB-OFDM through the combination of multiple smaller bandwidth channels concurrently such approaches are better suited to high data rate applications due to the increases in transmitter complexity and power usage.

Accordingly, it would be advantageous for an UWB transmitter to exploit an on-demand oscillator in order to up-convert the pulse thereby removing the requirement for a separate mixer. It would be further beneficial for the UWB transmitter to be CMOS logic compatible and for the pulse generation and oscillator to be both digitally tunable in order to provide control over the pulse bandwidth and center frequency and capable of rapid frequency adjustments on the order of the pulse repetition rate (PRR). Such UWB transmitters advantageously, in comparison to MB-OFDM UWB transmitters, providing spectral configurability, by sequentially changing the transmitted spectrum using a frequency and bandwidth hopping scheme. It would be further beneficial for such an UWB transmitter to offer dynamic duty cycling with fast power up time and OOK modulation to provide reduced power consumption by exploiting the low duty cycle of an IR-UWB symbol and the fact that only half the symbols require sending energy.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to ultra wideband wireless communications and more particularly communications systems exploiting mixerless transmitters and energy based receivers.

In accordance with an embodiment of the invention there is provided a transmitter supporting operation as an impulse radio with dynamic frequency and bandwidth hopping allowing dynamic setting of emitted power spectrum density.

In accordance with an embodiment of the invention there is provided a receiver supporting operation as an impulse radio receiver with dynamic configuration to receive transmitted signals from an impulse radio ultra-wideband transmitter.

In accordance with an embodiment of the invention there is provided a wireless link comprising a transmitter supporting operation as an impulse radio with dynamic pulse frequency and bandwidth hopping allowing dynamic setting of emitted power spectrum density, and a receiver supporting operation as an impulse radio receiver with dynamic configuration setting to the transmitter.

In accordance with an embodiment of the invention there is provided a device comprising:
a transmitter supporting operation as an impulse radio with dynamic pulse frequency and bandwidth hopping allowing dynamic setting of emitted power spectrum density;
a receiver supporting operation as an impulse radio receiver with dynamic configuration setting to the transmitter;
a first power control circuit selectively powering up and powering down predetermined portions of the transmitter in dependence upon the data being transmitted; and
a second power control circuit selectively powering up and powering down predetermined portions of the receiver in dependence upon the data being received.

In accordance with an embodiment of the invention there is provided a transmitter supporting operation as an impulse radio with dynamic pulse frequency and bandwidth hopping allowing dynamic setting of emitted power spectrum density without up-conversion of the data being transmitter.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 6 and 7 depict a programmable variable gain amplifier and driver with programmable NMOS array for a UWB transmitter according to an embodiment of the invention;

FIGS. 8A and 8B depict the reduced power consumption of a UWB transmitter according to an embodiment of the invention;

DETAILED DESCRIPTION

Figure 1:
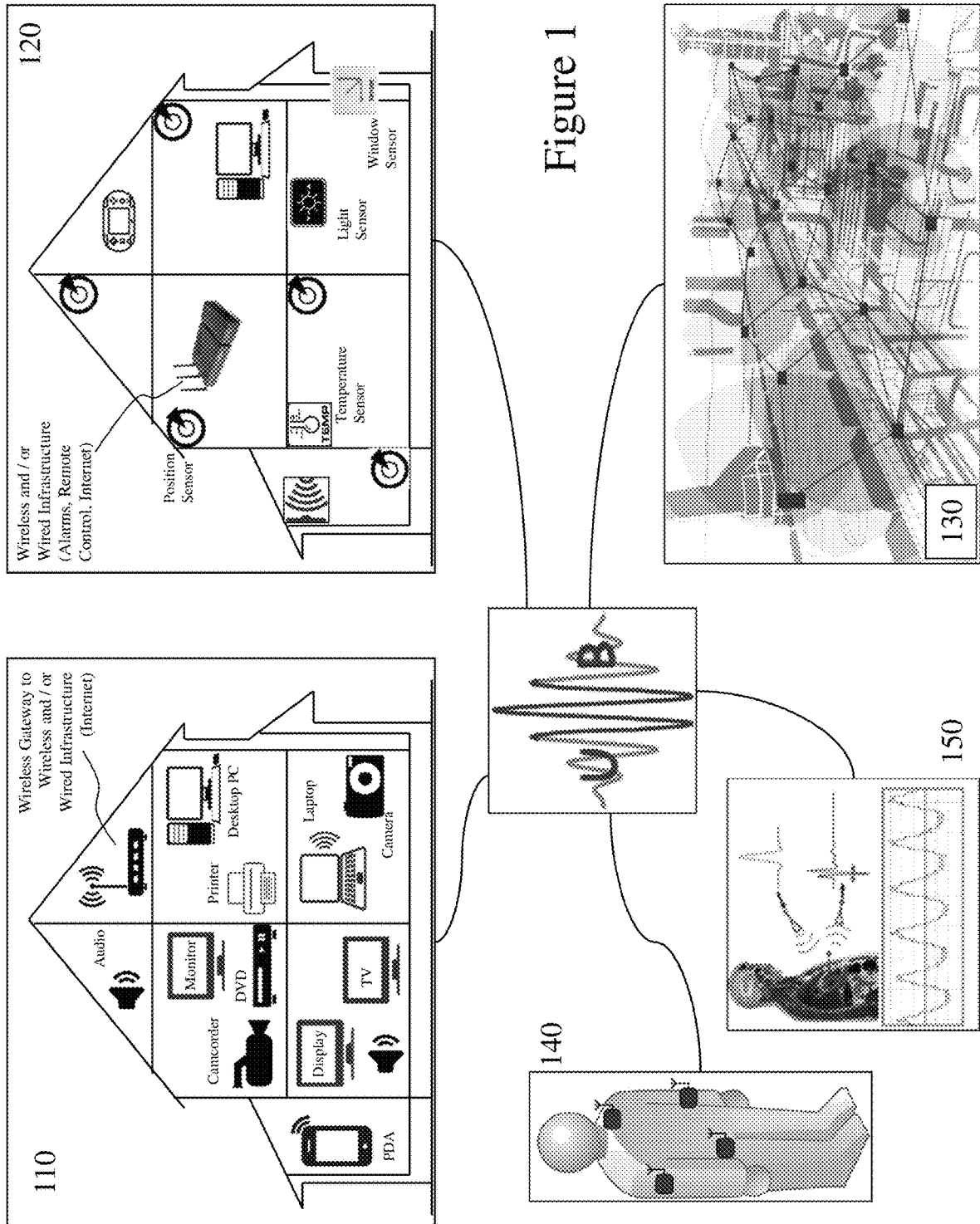
FIG. 1 depicts applications of UWB transmitters, receivers, and systems according to embodiments of the invention.

The present invention is directed to ultra wideband wireless communications and more particularly communications systems exploiting mixerless transmitters and energy based receivers.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

0. Impulse Radio Ultra Wideband System

As discussed supra UWB offers many potential advantages such as high data rate, low-cost implementation, and low transmit power, ranging, multipath immunity, and low interference. The FCC regulations for UWB reserved the unlicensed frequency band between 3.1 GHz and 10.6 GHz for indoor UWB wireless communication system wherein the low regulated transmitted power allows such UWB systems to coexist with other licensed and unlicensed narrowband systems. Therefore, the limited resources of spectrum can be used more efficiently. On the other hand, with its ultra wide bandwidth, an UWB system has a capacity much higher than the current narrowband systems for short range applications. Two possible techniques for implementing UWB communications are Impulse Radio (IR) UWB and multi-carrier or multi-band (MB) UWB. IR-UWB exploits the transmission of ultra-short (of the order of nanosecond) pulses, although in some instances in order to increase the processing gain more than one pulse represents a symbol. In contrast MB-UWB systems use orthogonal frequency division multiplexing (OFDM) techniques to transmit the information on each of the sub-bands. Whilst OFDM has several good properties, including high spectral efficiency, robustness to RF and multi-path interferences. However, it has several drawbacks such as up and down conversion, requiring mixers and their associated high power consumption, and is very sensitive to inaccuracies in frequency, clock, and phase. Similarly, nonlinear amplification destroys the orthogonality of OFDM. Accordingly, MB-UWB is not suitable for low-power and low cost applications.

In contrast IR-UWB offers several advantages, including unlicensed usage of several gigahertz of spectrum, offers great flexibility of spectrum usage, and adaptive transceiver designs can be used for optimizing system performance as a function of the data rate, operation range, available power, demanded quality of service, and user preference. Further, multi-Gb/s data-rate transmission over very short range is possible and due to the ultra-short pulses within IR-UWB it is very robust against multipath interference, and more multipath components can be resolved at the receiver in some implementations, resulting in higher performance. Further, the ultra-short pulses support sub-centimeter ranging whilst the lack of up and down conversion allows for reduced implementation costs and lower power transceiver implementations. Beneficially, ultra-short pulses and low power transmissions make IR-UWB communications hard to eavesdrop upon.

A IR-UWB transmitter as described below in respect of embodiments of the invention in Section 1 with reference to FIGS. 2 to 19 respectively exploits an on-demand oscillator following a pulse generator in order to up-convert the pulses from the pulse generated whilst avoiding the requirement of a separate mixer. Implementable in standard CMOS logic both the pulse generator and the on-demand oscillator are digitally tunable in order to provide control over the pulse bandwidth and center frequency. Further, by exploiting a digitally controlled ring oscillator for the on-demand oscillator the IR-UWB transmitter is designed to allow very quick frequency adjustments on the order of the pulse repetition rate (PRR). Beneficially this technique provides the same advantages as MB-OFDM in respect of spectrum configurability, achieved by sequentially changing the transmitted spectrum using a frequency hopping scheme, whilst maintaining the benefits of IR-UWB. Further, by providing advanced duty cycling with fast power up time combined with On-Off Shift Keying (OOK) modulation the IR-UWB according to embodiments of the invention allows significant reductions in power consumption by exploiting the low duty cycle of a UWB symbol and the fact that only half the symbols require sending energy.

In addition to defining the operating frequency range for UWB systems the different regulatory bodies all specify and enforce a specific power spectral density (PSD) mask for UWB communications. The PSD mask employed in respect of embodiments of the invention described below in Section 3 and in respect of FIGS. 20 to 30B is the FCC mask for which mask data are summarized in Table 1 below for the 3100 MHz-10600 MHz (3.1 GHz-10.6 GHz) range.

TABLE 1

FCC Masks for Indoor - Outdoor for Different Frequency Bands

| Frequency Range | Indoor EIRP Limit (dBm/MHz) | Outdoor EIRP Limit (dBm/MHz) |
| --- | --- | --- |
| <960 | −−49.2 | −49.2 |
| 960-1610 MHz | −75.3 | −75.3 |
| 1610-1990 MHz | −53.3 | −63.3 |
| 1990-3100 MHz | −51.3 | −61.3 |
| 3100-10600 MHz | −41.3 | −41.3 |
| >10600 MHz | −51.3 | −61.3 |

Accordingly, it would be evident that the upper limit of −41.3 dB/MHz across the 3.1 GHz-10.6 GHz frequency range is the same limit imposed on unintentional radiation for a given frequency in order not to interfere with other radios. Basically, for a given frequency, the UWB radio operates under the allowed noise level which creates the relationship presented in Equation (1) between $E_p$, the transmitted energy per pulse, the maximum spectral power S, the bandwidth B, the bit rate $R_b$ and the number of pulses per bits $N_{ppb}$.

$$E_p \cdot N_{ppb} \cdot R_b \le S \cdot B \qquad (1)$$

The IEEE has published a few standards for a physical layer (PHY) for UWB radio in Personal Area Networks (IEEE 802.15.4a-2007), Body Area Networks (IEEE 802.15.4a-2007) and Radio-Frequency Identification (IEEE 802.15.4f-2012). These standards use mostly relatively large pulses resulting in relatively narrow bandwidth which is up-converted to a specific center frequency in order to fill predetermined channels. The data is encoded using pulse-position-modulation (PPM) and bi-phasic shift keying (BPSK) is used to encode redundancy data. Every bit consists of one or more pulses scrambled in phase depending on the target data rate. These standards allow considerable flexibility on channel availability and data rates. The standard also defines the preamble, headers for the data packet and ranging protocol.

These IEEE standards are designed with multiple users in mind and use different channels to transmit the data, thereby putting a heavy constraint on pulse bandwidth and limiting the transmitted energy. Prior art on non-standard transmitter attempts to make better use of the available spectrum by using narrow pulses, which therefore have a larger bandwidth thereby increasing the maximum transmitted energy according to Equation (1). Accordingly, these transmitters are non-standard and were also designed for different data rates, frequencies, pulse width, etc. Additionally, they also used various encoding schemes, most notably PPM, OOK or BPSK.

Within this work the inventors have established an energy receiver which is able to adapt to a variety of IR-UWB pulses and bit encoding thereby supporting communications from both IR-UWB transmitters compliant to IEEE standards as well as those that are non-standard. However, as energy detection based receivers have no way to extract the phase of the received pulses they cannot detect any modulation involving phase detection such as BPSK. However, most of the other encodings can be translated in some way into energy levels and proper timing. This requires in turn the ability to achieve synchronization and to adjust the integration windows appropriately.

Accordingly, an IR-UWB communications link requires a transmitter generating the ultra-short pulses and a receiver to receive them. In many applications these are also co-located as a transceiver. It would be beneficial for these to be implemented using designs compatible with CMOS electronics allowing low cost high volume manufacturing that leverages existing foundry capabilities as well as allowing the IR-UWB transceiver to be integrated with additional electronics such as sensor interfaces, microelectromechanical sensors fabricated through silicon micromachining and/or post-CMOS processing, microprocessors, microcontrollers, etc.

1. IR-UWB Transmitter Circuit

Figure 2:
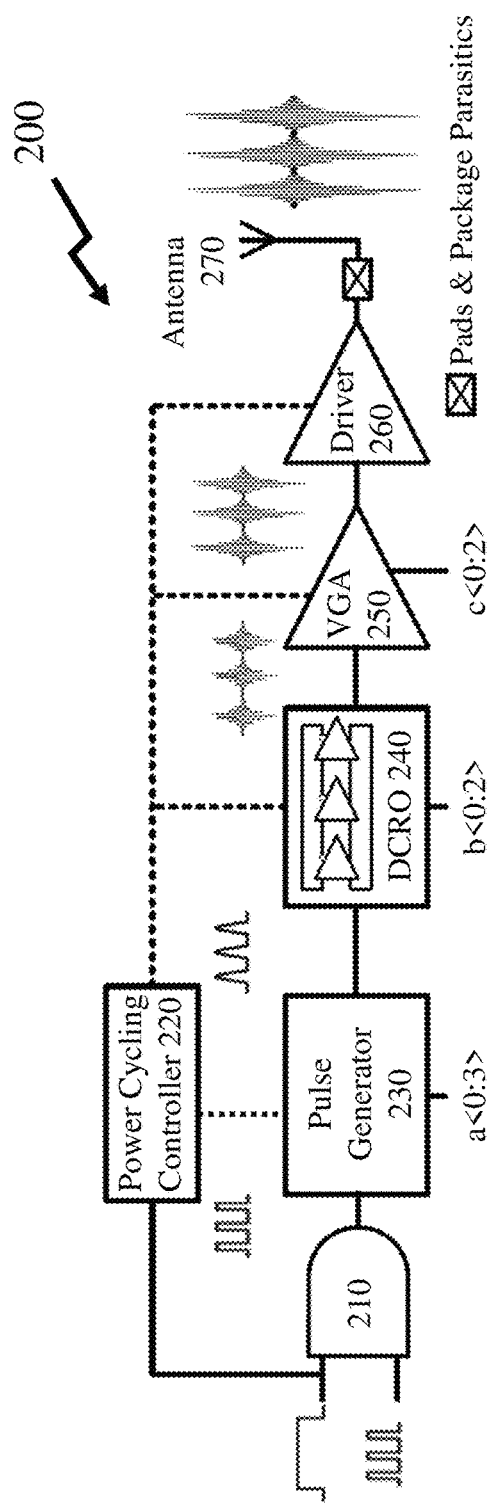
FIG. 2 depicts a block diagram of a UWB transmitter according to an embodiment of the invention.

1A. Transmitter Overview:

As depicted in FIG. 2 an IR-UWB transmitter 200 according to embodiments of the invention is composed of five main blocks plus the antenna. First a programmable impulse is produced by a pulse generator 230 at clocked intervals when the data signal from AND gate 210 is high based upon control signals presented to the AND gate 210. The pulses from the pulse generator 230 are then up-converted with a programmable multi-loop digitally controlled ring oscillator (DCRO) 240, such as that described by Gerosa et al in "A Digitally Programmable Ring Oscillator in the UWB Range" (IEEE Int. Symp. Circuits and Systems 2010, pp. 1101-1104). The output from the DCRO 240 is then coupled to a variable gain amplifier (VGA) 250 in order to compensate for any frequency dependency of the pulse amplitude. Finally, a driver 260 feeds the antenna 270, overcoming typical package parasitics, such as arising from packaging the transceiver within a quad-flat no-leads (QFN) package. In order to further reduce the power consumption of the IR-UWB transmitter (IR-UWB-Tx) 200 according to embodiments of the invention a power cycling controller 220 dynamically switches on or off these functional blocks when the data signal is low.

Figure 3:
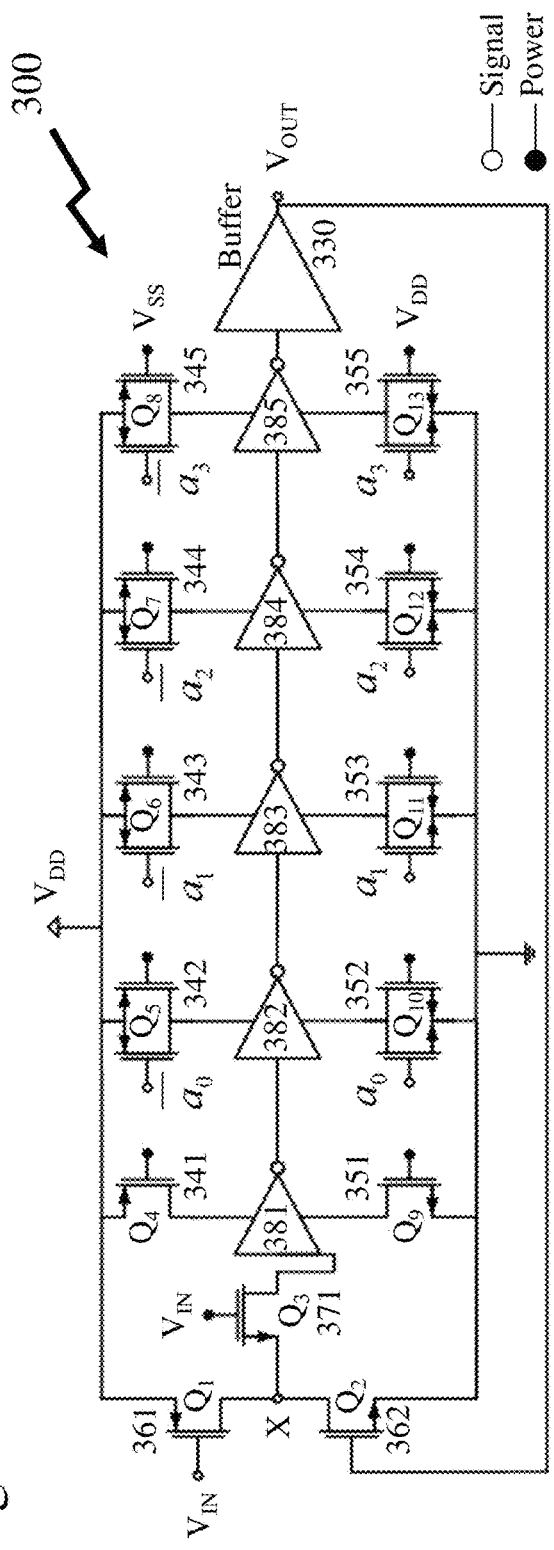
FIG. 3 depicts a Gaussian pulse generator for a UWB transmitter according to an embodiment of the invention.

1B. Pulse Generator:

Now referring to FIG. 3 there is depicted a circuit schematic 300 of a pulse generator 220 according to an embodiment of the invention implementable in CMOS wherein the pulse generator 220 generates a pulse approximating a Gaussian shape when triggered by a rising edge of an input Vin. The input is obtained from AND gate 210 from a pulse clock and the data signal. This allows full control over the final symbol shape. The pulse repetition rate (PRR) is determined by the clock signal frequency and the number of pulses generated depends on the length of the data signal high time whilst the period of the data signal determines the data rate.

Initially, the node X is charged to Vdd and Q2 362 is in cutoff. When Vin goes high, Q1 361 is cut-off and Q3 371 is turned on, transferring the Vdd level to the input of the first inverter 381. The signal then propagates through second to fifth inverters 382 to 385 respectively to generate the output, Vout, thereby creating the rising edge of the impulse. When Vout is high, Q2 362 is activated and the node X discharges which toggles the first inverter 381. This propagates through the inverter chain, comprising second to fifth inverters 382 to 385 respectively, lowering Vout thereby creating the falling edge of the pulse. When Vin goes low again between pulses, node X is allowed to recharge, rearming the pulse generator for the following rising edge of the input. To ensure sufficient drive between the inverter chain, first to fifth inverters 381 to 385 respectively, and the following VCRO 240 an output buffer 330 is added at the end.

The pulse width generated is based on the delay through the five inverter chain, first to fifth inverters 381 to 385 respectively, of which four are programmable, namely second to fifth inverters 382 to 385 respectively. First inverter 381 being coupled to power rail Vdd and ground via Q4 341 and Q9 351 whilst second to fifth inverters 382 to 385 are coupled to Vdd via first to fourth resistor pairs Q5 to Q8 342 to 345 respectively and ground via fifth to eighth resistor pairs Q10 to Q13 352 to 355 respectively. One of the transistors of a pair is always on, giving a base current for the longest delay. Turning on the second transistor of a pair increases available current to the inverter, thereby reducing its delay. A 4-bit word a0, a1, a2, a3 controls the starving of the inverters, which may for example be sized to obtain a linearly varying delay with the 4-bit word, such that the bits a0, a1, a2, a3 are coupled to the fifth to eighth resistor pairs Q10 to Q13 352 to 355 respectively with the other side of each inverter pair coupled to Vdd. The inverse of the 4-bit word, $\overline{a0},\overline{a1},\overline{a2},\overline{a3}$ are coupled to the first to fourth resistor pairs Q5 to Q8 342 to 345 respectively with the other side of each inverter pair coupled to Vss. Pulse generator 220 as depicted by circuit schematic 300 may be powered up and down by enabling/disabling the power rails Vdd and Vss, for example, via gating transistors, not shown for clarity, controlled via a power control signal or signals.

Figure 4:
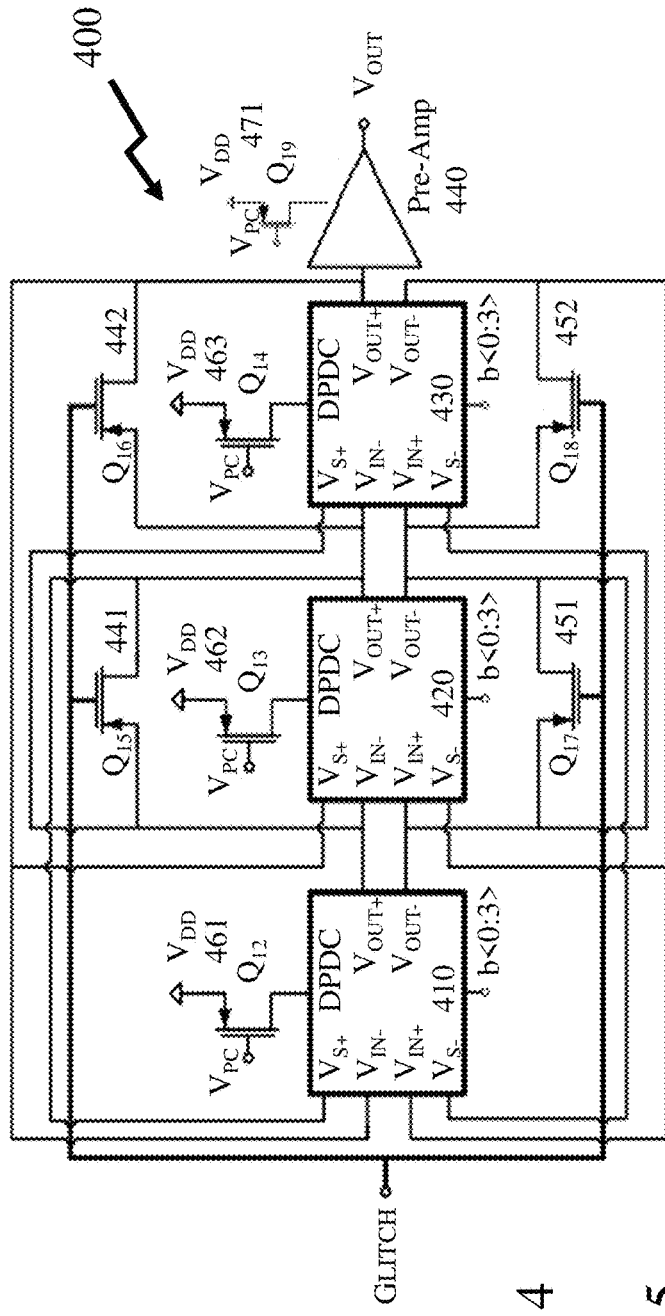
FIG. 4 depicts a voltage controlled ring oscillator for a UWB transmitter according to an embodiment of the invention.
Figure 5:
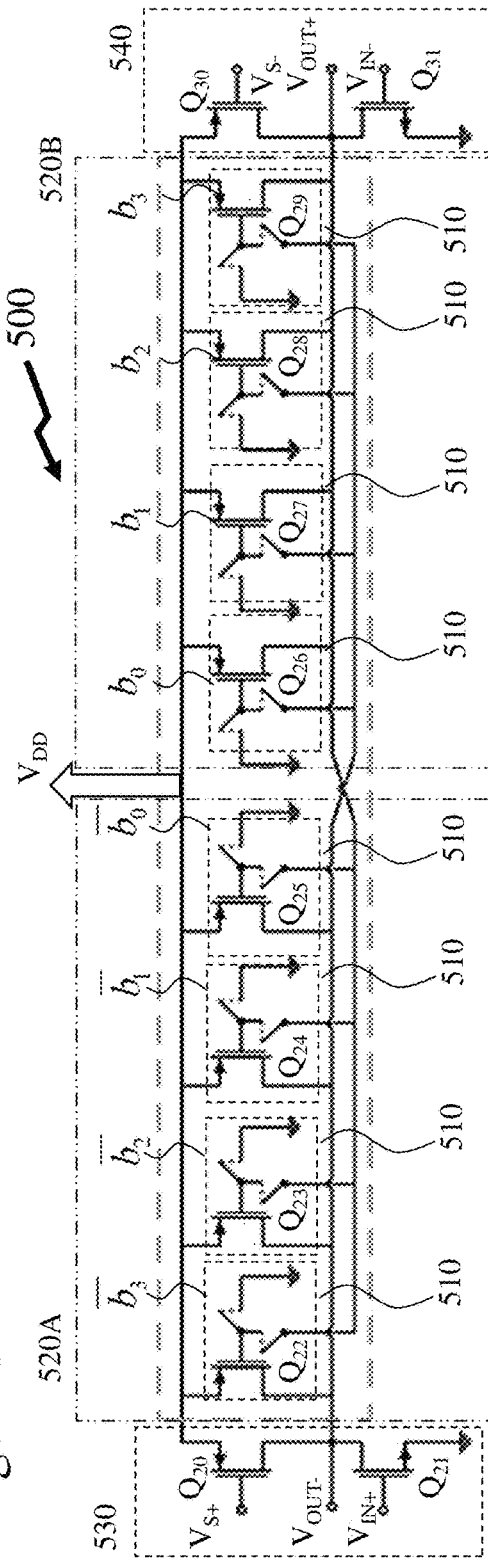
FIG. 5 depicts a digitally programmable delay cell for a UWB transmitter according to an embodiment of the invention.

1C. Programmable Digitally Controlled Ring Oscillator (DCRO):

To up-convert the Gaussian pulse efficiently without requiring either a mixer or a phase-locked loop a transmitter according to an embodiment of the invention exploits a DCRO 240 as depicted in circuit schematic 400 in FIG. 4. In order to allow for toggling of the oscillator by the pulse generator, first to fourth transistors Q15 441, Q16 442, Q17 451 and Q18 452 have been added in parallel with first to third digitally programmable delay cells (DPDC) 410 to 430 respectively that form the ring oscillator. These transistors are on when no input pulse is present, which reduces the gain of each DPDC such that the oscillator is off. The gain of each cell is restored when these transistors are turned off by the pulse, allowing the circuit to oscillate. Each DPDC being coupled to supply voltage Vdd via Q12 461, Q13 462, and Q14 463 with control line Vpc. The output of the third DPDC 430 is coupled to pre-amplifier 440 to generate the output and is again coupled to the supply rail Vdd via Q19 471 with control line Vpc. Accordingly, the DCRO 240 depicted in circuit schematic 400 in FIG. 4 may be selectively powered up and down through the Vpc control line.

The maximum oscillation frequency of the DVRO 240 as depicted by circuit schematic 400 in FIG. 4 may be limited by the first to fourth transistors Q15 441, Q16 442, Q17 451 and Q18 452. Within fabricated CMOS implementation to date the inventors designs exploiting standard commercial foundry design rules have yielded oscillation frequency ranges from 3.9 GHz to 9.3 GHz. To equalize the output amplitude over the frequency range, the pre-amplifier 440 typically drives the next stage, being VGA 250, with a slanted gain response. According to an embodiment of the invention this may be implanted using a pair of cascaded common sources with an appropriately sized inductor sized, e.g. the inventors have selected values to induce peaking at approximately 8 GHz.

1D. Digitally Programmable Delay Cell: As depicted in FIG. 4 first to third DPDCs 410 to 430 respectively are employed within the circuit schematic 400 for DVRO 240. Each DPDC of the first to third DPDCs 410 to 430 respectively may, for example, be implemented as depicted in circuit 500 in FIG. 5 exploiting a latched differential inverter formed by input transistor pair 530, comprising Q20 and Q21, which is coupled to output transistor pair 540, comprising Q30 and Q31, via a programmable pull-up network comprising pull-up blocks 510. The transistors Q20 and Q30 act as an additional pull-up network to anticipate the switching of the inverter, and compensate for the slower PMOS transistors versus their NMOS counterparts. This is achieved by driving Q20 and Q30 using the output of an earlier cell. Then, that output is used to drive Q21 and Q31, allowing for a reduction in the overall latency of the inverter chain and an increased frequency range.

The latch differential inverter formed by input transistor pair 530 is connected to eight pull-up blocks 510 comprising first to eight transistors Q22 to Q29 respectively composed of first and second arrays 520A (Q22 to Q25) and 520B (Q26 to Q29) of PMOS transistors whose sizes are binary-weighted. A 4-bit word b0, b1, b2, b3 controls the second array 520B whilst the inverse 4-bit word $\overline{b0}$, $\overline{b1}$, $\overline{b2}$, $\overline{b3}$ controls the first array 520A. The control bits determined whether the PMOS transistor output of a pull-up block 510 is connected to ground or to the output node adjusting the drive of the pull-up network. With the addition of more PMOS transistors connected to the output nodes, the latching effect is strengthened, requiring an increased time for pull down and thereby increasing the overall delay of each cell.

1E. Programmable Variable Gain Amplifier:

Within the IR-UWB-Tx 200 a VGA 250 such as depicted in first circuit 600A in FIG. 6 is implemented to counteract the frequency dependent amplitude of the DCRO 240 and adjust the final gain depending on the required output power. As depicted in circuit 600 the VGA 250 is composed of a common source amplifier with an active load. Capacitor Cb1 601 and resistor Rb 602 are used to decouple the input of the first circuit 600A and bias the gate of Q33 604. Transistor Q32 605 has a dual functionality, acting as an active load and cutting off the bias current in the VGA. Accordingly, under the control signal Vpc the bias current may be disabled to Q32 605 or where the bias is enabled Q33 605 acts as the active load. To improve the uniformity of the gain over all the operating bandwidth, a series inductor L1 606 is added at the output to resonate with the decoupling capacitor Cb2 607 within the second circuit 600B, Driver 260, at higher frequencies.

The gain of the first circuit 600A is controlled by a digitally programmable NMOS array (DPNA) 603 which is depicted in FIG. 7 as comprising a 3:8 bit decoder that activates only one transistor within the NMOS Array 720 for each sequence of the 3-bit input control word c0, c1, c2. The NMOS Array 720 is composed of eight different size transistors which act as a tunable degeneration resistance ($r_{0DPNA}$) and thus control the gain of the VGA 250. The overall voltage gain $G_v$ of the VGA 250 being approximately given by Equation (2).

$$G_v \approx \frac{r_{0-32} \parallel r_{o-33}}{1/g_{mQ33} + r_{0DPNA}} \quad (2)$$

1F. Driver:

To preserve the up-converted pulse integrity, a driver 260 is provided between the VGA 250 output and the 50Ω Antenna 270 and account for package parasitics. Second circuit 600B representing a driver 260 according to an embodiment of the invention in FIG. 6 whilst third circuit 600C represents the package parasitics. As depicted a relatively low Q inductor L2 610 causes a wide frequency peaking to enlarge the frequency of operation of the driver 260. Capacitor Cr 611 resonates with L2 610 whilst simultaneously acting as a decoupling capacitor for the driver 260. Capacitor Ca 612 ensures wideband output matching, typically a return loss of at least 10 dB being required across the band of operation. The control transistor Q34 coupled to the power cycling signal, Vpc, allows the supply to the driver to be disconnected in order to minimize the power consumption between transmitted pulses.

As depicted the third circuit 600C represents the parasitics between the driver 260 and antenna 270 and comprises a pad capacitance Cpad 616 for the integrated circuit bond pad together with QFN package resistance, inductance and capacitance represented by $R_{QFN}$ 615, $L_{QFN}$ 613, and $C_{QFN}$ 614 respectively.

1G: Power Cycling:

According to embodiments of the invention the low power consumption of the IR-UWB-Tx 200 represented by FIGS. 2 to 7 respectively is further lowered by the use of the Power Cycling Controller 220 which as depicted in FIG. 2 is coupled to the Pulse Generator 230, DCRO 240, VGA 250, and Driver 260. The Power Cycling Controller 220 determines whether to power up/power down these elements based upon the data signal and the transmit clock. This Power Cycling Controller 220 includes, for example, different non-overlapping signal generation circuits that create the appropriate signals, such as for transistors Q12 354 and Q13 355 for Pulse Generator 230 in circuit schematic 300, transistors Q14 463 and Q19 471 for DCRO 240 in circuit schematic 400, transistor Q32 605 in VGA 250 in first circuit 600A in FIG. 6, and transistor Q34 610 in Driver 260 in second circuit 600B in FIG. 6. These signals, generally referred and denoted to as Vpc are appropriately timed by the Power Cycling Controller 220 such that any disruptions due to the power cycling have minimal impact on the output signal. In this manner the inventors have been able to demonstrate that the power consumption for an IR-UWB-Tx 200 according to embodiments of the invention may be reduced by a factor of 25.

Figure 8B:
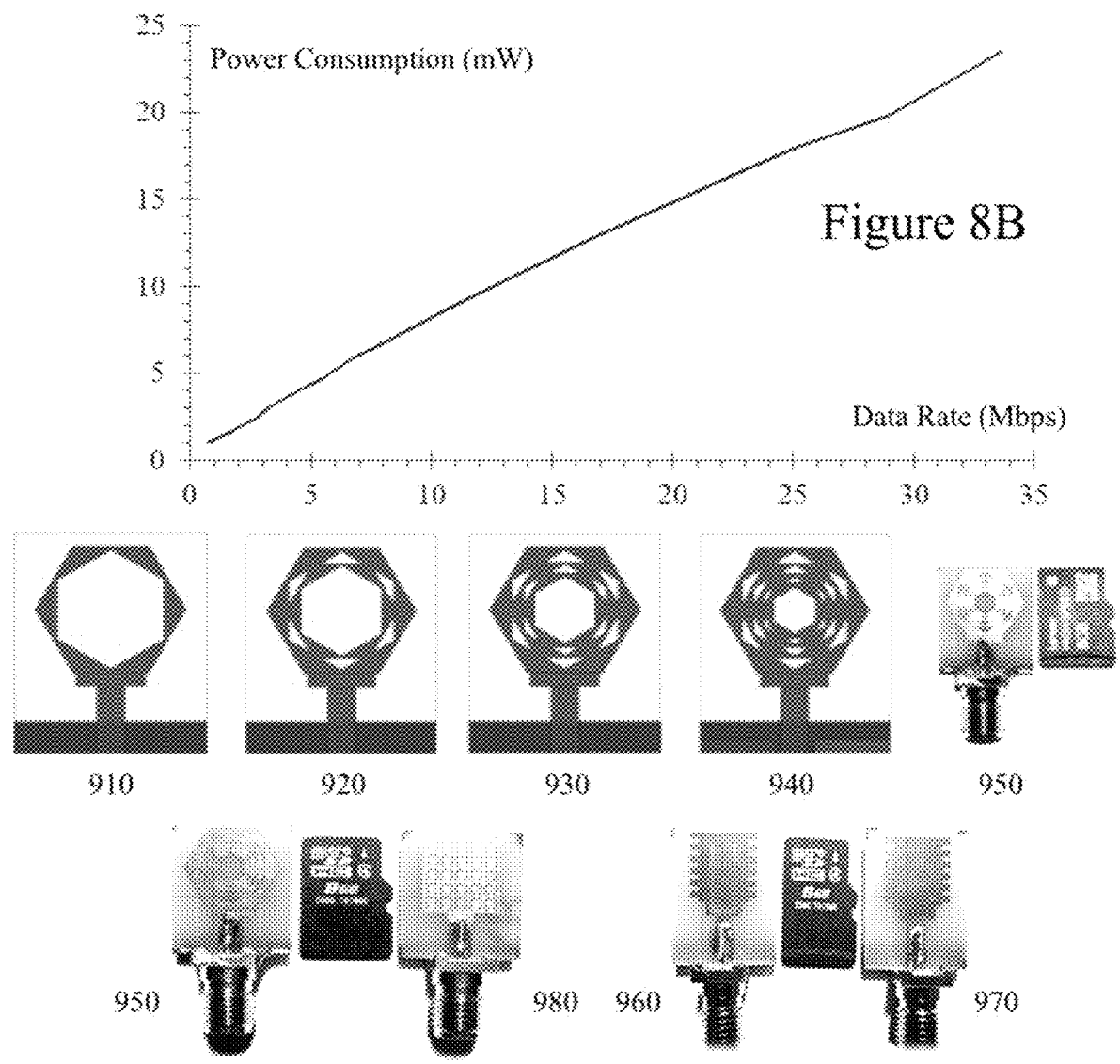

Referring to FIGS. 8A and 8B there are depicted power consumption data for an exemplary CMOS IR-UWB-Tx according to embodiments of the invention wherein at full power and maximum transmission rate, using 3 pulses per symbol, the IR-UWB-Tx consumes 26.33 mW but in sleep mode 0.094 mW, i.e. 94 µW. Accordingly, with power cycling at power on levels of 10%, 40%, and 70% the IR-UWB-Tx consumes 2.99 mW, 11.35 mW, and 17.53 mW respectively. Accordingly, to transmit MPEG-1 the IR-UWB-Tx need operate at only approximately 7% power cycling and consume approximately 2.2 mW. The IR-UWB operates from a 1.2 V supply and measured power consumption is as low as 0.9 mW at a 10 Mbps data rate, depending on the frequency and length of pulses. It is also evident that the power consumption with full power cycling varies from approximately 0.84 mW at 1 Mbps to approximately 24 mW at 33 Mbps as depicted in FIG. 8B.

Figure 9:
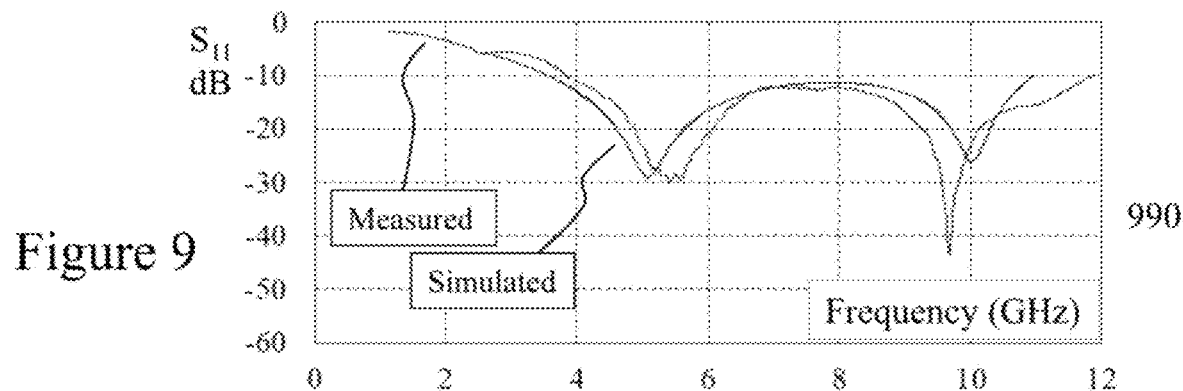
FIG. 9 depicts a design sequence for a fractal antenna together with compact antenna designs for a UWB transmitter according to an embodiment of the invention.

1H: Antenna:

As depicted in FIG. 2 the output of the driver 260 is coupled to an antenna 270 to convert the electrical signals within the electrical circuit to electromagnetic waves propagating through the air. The antenna 270 is the largest component in an UWB system. Various techniques have been introduced in an attempt to reduce the footprint of the patch antenna. Some of the most promising methods use periodicity in order to achieve that effect, either by using fractal designs, see for example Ding et al in "Design of a CPW-fed Ultra Wideband Crown Circular Fractal Antenna" (IEEE Int. Symp. Antennas and Propagation, 2006, pp. 2049-2052) and Kimar et al in "On the Design of CPW-fed Square Octal Shaped Fractal UWB Antenna" (Applied Electromagnetics Conference, 2004, pp. 1-3), or by using a composite Electric-Magnetic-Electric (EME) metal strip, see for example Chang-Yi et al in "Applying Electric-Magnetic-Electric (EME) Composite Metal Strips to Reduce the Size of Patch Antennas" (Asia-Pacific Microwave Conference, 2001, vol. 3, pp. 1151-1154). The fractal antenna employed within experimental measurements within this specification is based upon a hexagonal topology that increases the radiation field with a high current density at each corner. Referring to FIG. 9 first to fourth images 910 to 940 depict the iterative design process with original design, first order iteration, second order iteration and final antenna respectively. Fifth image 950 depicts the final antenna which is 14 mm by 16.52 mm and employs FR4 epoxy substrate with a thickness of 1.6 mm and a dielectric constant $E_r$=4.4. Two metal strips connected to the ground are added to the final design in order to increase the bandwidth and improve the return loss at low frequencies. The final design takes into account the specifications of the substrate in optimizing the antenna with respect to the radius of polygons and the slot sizes.

Also depicted in FIG. 9 is an alternate antenna designs depicted as electrical tracing 960 and first ground plane 970 together with its simulated and measured electrical return loss in first graph 990 over the frequency range 10 MHz to 12 GHz indicating operation from approximately 3.6 GHz to 11.5 GHz. Similarly polygon fractal antenna 950 and alternative antenna 980 are depicted.

2. IR-UWB Transmitter Measurements

2A. Prototyping Board and Test Bench:

In order to perform tests on the integrated circuit and validate its operation, it was necessary to design a PCB to make a link between the microchip (1.82 mm² dimensions) and the test equipment. The chips were packaged in a 64 pin QFN and connected to the board through a RF socket designed specifically for the very small package. The RF output of the transmitter is connected to SMA connectors with microstrip lines ensuring 50Ω operation at the high frequencies of operation. To simplify the test setup, all digital control signals are routed directly out of the chip in parallel. To connect all those control signals to the external control system which is automatically operated by an FPGA (Field-programmable gate array), a VHDCI (very-high-density cable interconnect) was incorporated into the PCB. The VHDCI operates adequately up to 300 MHz which is sufficient for the digital control signals employed in testing.

Potentiometers were added to each DC voltage to adjust the operating conditions while allowing offsetting of some of the manufacturing process variations. In order to help signal and power integrity, decoupling capacitors between 0.1 µF and 0.1 nF were employed on every non-RF signal and power pin. The final prototyping board measured 13.1 cm×11.9 cm and handles all the various input/output (I/O) signal types; namely the RF input and output of the transceiver, and the control signals which are used to adjust the frequency of output pulses (b0 to b3) and its width (a0 to a3). Considering the high number of control signals (32 signals for both IR-UWB Transmitter and Receiver), all signals and clocks are generated with an FPGA Spartan 6. This provides a direct control of the chip by the FPGA, through the VHDCI connection between the two boards. A Logic Analyzer Probe was used to measure all control signals, whilst the RF output was observed with an oscilloscope, e.g. Tektronix Series 70000. This powerful tool allows control of the FPGA directly via a serial communication. This test bench provides a fast and efficient setup and presents live observation of the impact of the control signal (generated by FPGA) on the transmitter output.

Figure 10:
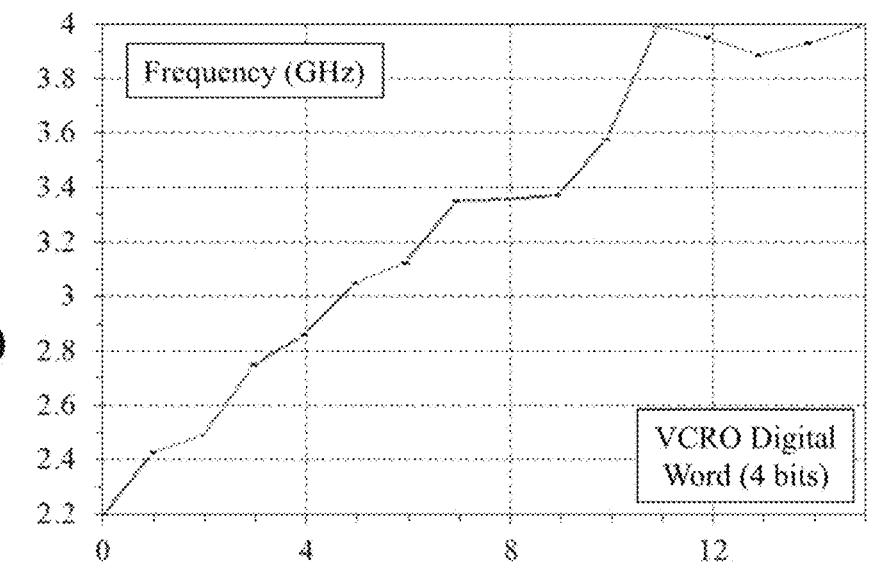
FIGS. 10 and 11 depict the pulse frequency and pulse width for a UWB transmitter according to an embodiment of the invention.

2B. Frequency Modulation:

The pulse center frequency was measured for all the bit sequences of the VCRO. As shown in FIG. 10 the frequency varies from approximately 2.2 GHz to approximately 4 GHz whilst in FIG. 13 the measured pulse shape obtained at three different frequency settings with their output power spectrum density are depicted.

Figure 11:
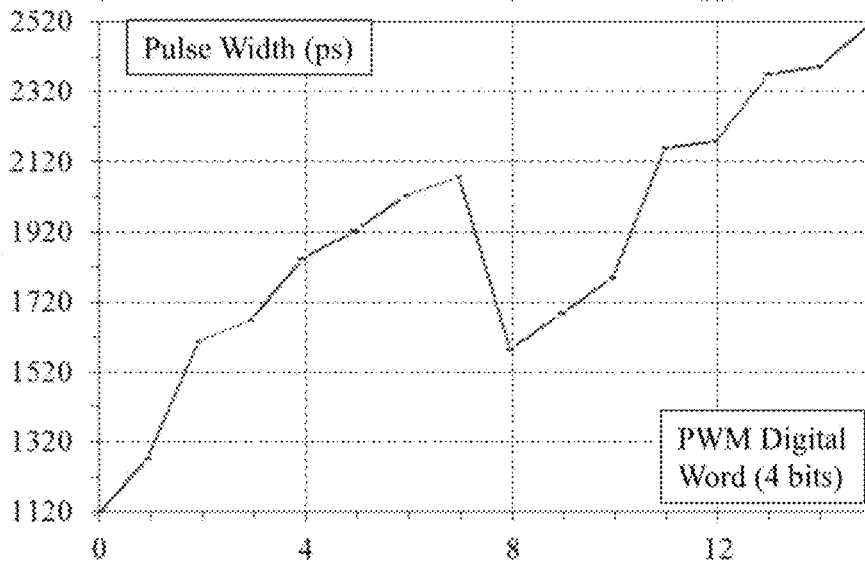
Figure 14:
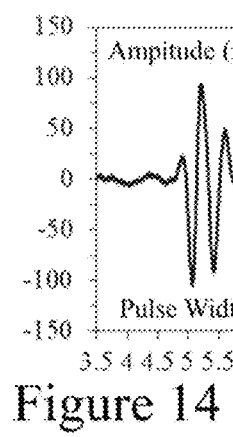
FIG. 14 depicts pulse measurements for a UWB transmitter according to an embodiment of the invention at three different control settings.
Figure 14:
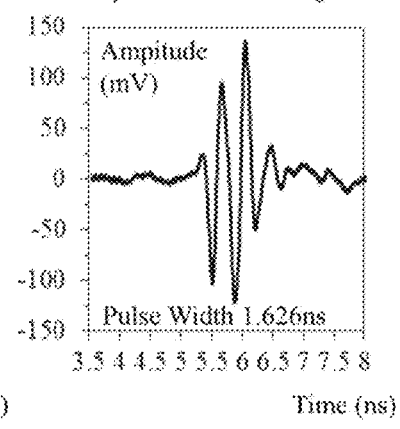
Figure 14:
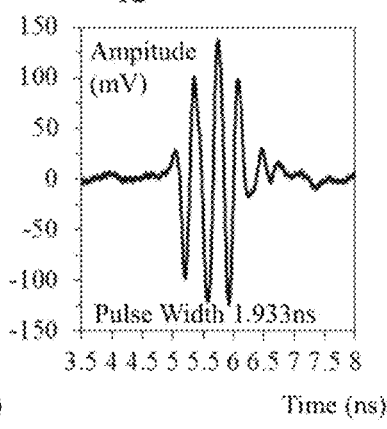

2C. Pulse Width Modulation:

The transmitter pulse width was measured for all bit sequences of the Gaussian pulse generator. Referring to FIG. 11 the measured pulse width is depicted a varying from 1120 ps to 2520 ps in two operation modes whilst FIG. 14 shows the pulse shape obtained for three different width settings.

Figure 12:
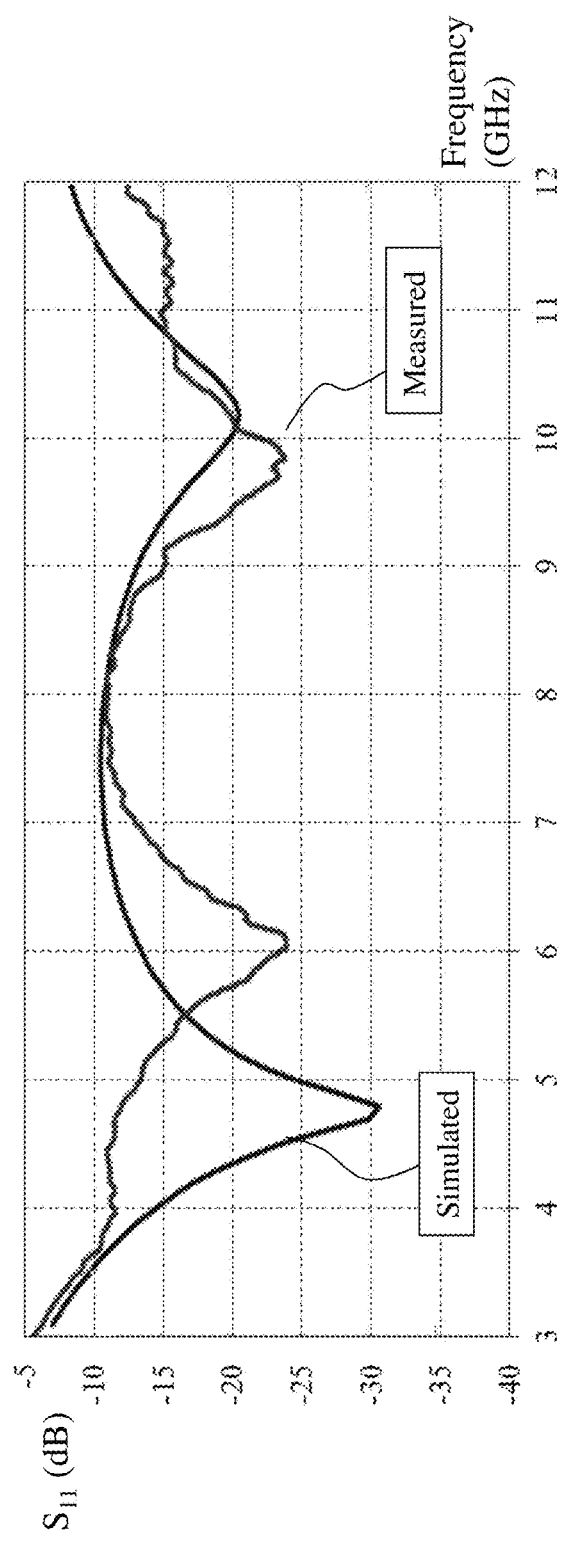
FIG. 12 depicts simulated and measured RF return loss for a fractal antenna a UWB transmitter according to an embodiment of the invention.

2D. Fractal Antenna:

This fractal antenna has been manufactured using a conventional photolithographic process and measured with a Vector Network Analyzer using SMA connectors to extract return loss and radiation patterns in an anechoic chamber. The antenna was also simulated with the HFSS software suite in order to compare with the measured parameters. FIG. 12 depicts the simulated and measured return loss for the fractal antenna 950. The agreement between simulated and measured results is excellent. The fractal antenna 950 has an excellent return losses performances and radiation pattern, with bandwidth of 8.85 GHz, from 3.65 GHz to 12.5 GHz, which is better than the simulation results.

2E. Spectrum Frequency Hoping:

Traditionally, the ability to change the center frequency in a UWB transmitter has been used in multi-channel/multi-band communication systems. These channels allows multiple devices to cohabit but also can be selected in order to mitigate interference presents in the environment or avoid specific local frequencies. Typically, those channels are well defined and have a relatively narrow bandwidth. This severely limits the amount of energy that can be transmitted because we are using only a fraction of the available spectrum. The inventors in contrast have demonstrated a new method to maximize the bandwidth efficiency by using a pulse frequency and bandwidth hopping technique which can be applied to maximize the transmission power while keeping a fine control on the emitted spectrum to avoid unwanted frequency bands. In order to mitigate the effects of interfering signals and maximize the transmitted power the IR-UWB system according to embodiments of the invention provides the ability to transmit several pulses at different frequencies and of various pulses lengths (i.e., pulse bandwidth) thereby providing control of the transmitted spectrum. Accordingly, IR-UWB transmitters according to embodiments of the invention may exploit frequency and bandwidth hopping for both maximizing the spectrum coverage and to avoid interference. Embodiments of the invention may also exploit pulse amplitude hopping using the VGA in order to add a degree of freedom to the spectrum configurability.

Figure 15:
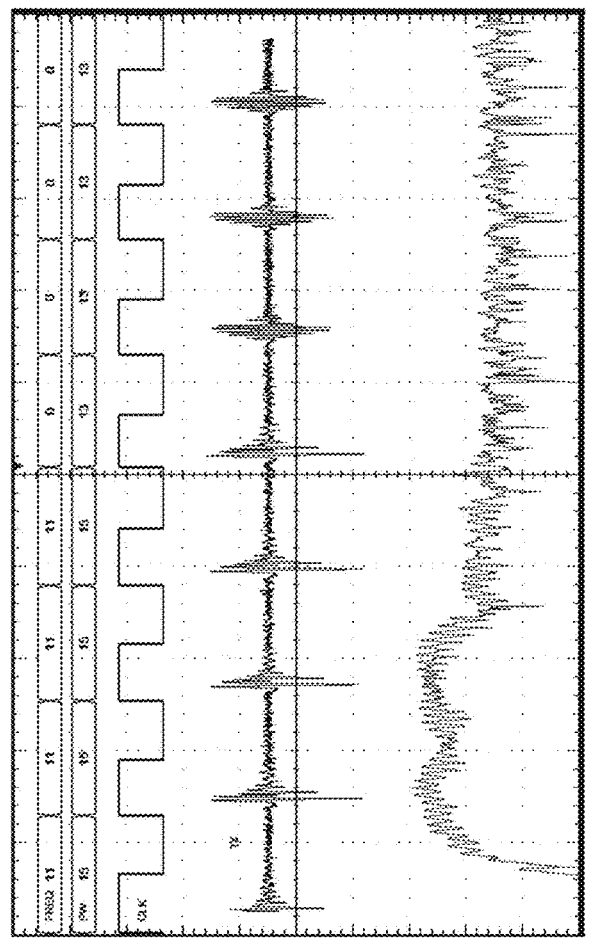
FIG. 15 depicts frequency hopping for a UWB transmitter according to an embodiment of the invention.
Figure 13:
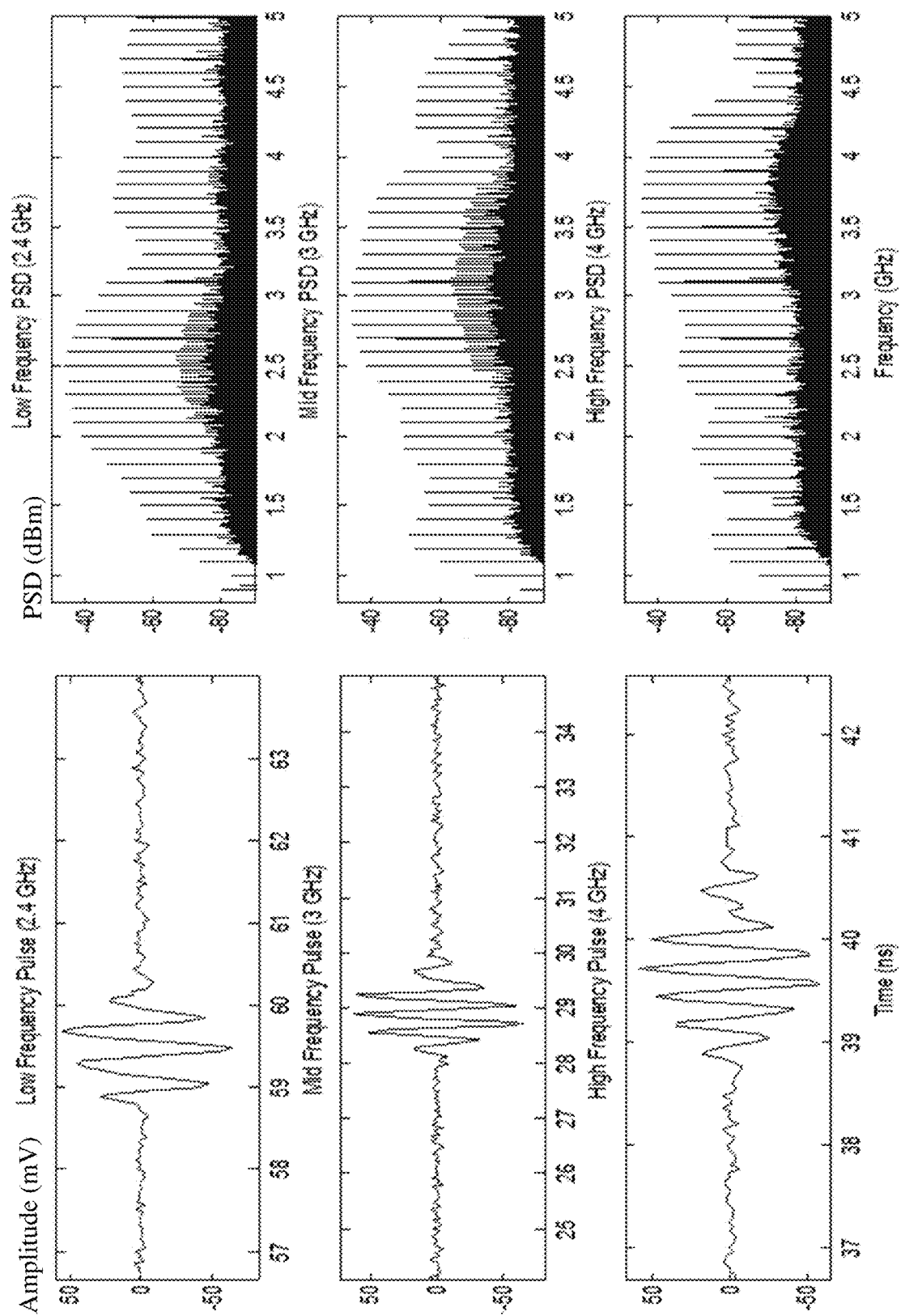
FIG. 13 depicts digitally controllable pulse shape and output power spectrum density under control tuning for a UWB transmitter according to an embodiment of the invention.
Figure 16:
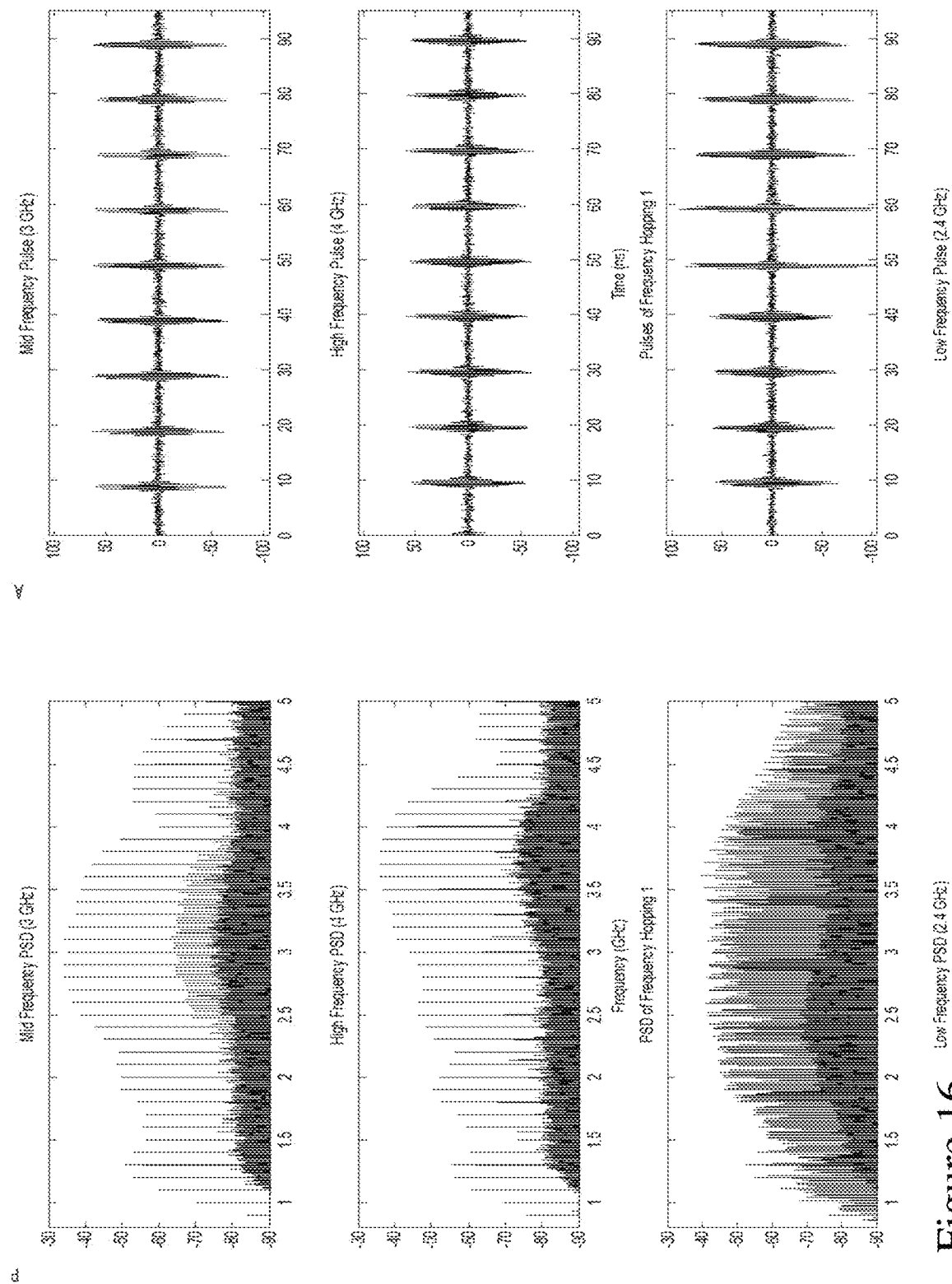
FIG. 16 depicts pulse amplitude and centre frequency tuning during frequency hopping operation of a UWB transmitter according to an embodiment of the invention.

Referring to FIG. 15 there is depicted a pulse sequence from an IR-UWB transmitter depicting four pulses at 4 GHz followed by three pulses at 3 GHz. Similarly referring to FIG. 16 the PSD and pulse profiles for a mid-frequency pulse at 3 GHz and a high frequency pulse at 4 GHz are depicted together with the frequency hopping between operation at 3 GHz and 4 GHz.

2F. Uniform Coverage of the Transmitted Power Spectrum:

In order to uniformly fill the frequency spectrum between 1.5 GHz and 4.5 GHz, the FPGA was configured to generate a pulse sequence composed of two pulses at 2.4 GHz with a length of 2.3 ns, followed by three pulses at 3.5 GHz with a length of 2.38 ns and finally four pulses at 4 GHz with a length of 2.5 ns. Sending a different number of pulses for each frequency allows us to adjust the transmitted power more accurately around the given frequency. According, referring to FIG. 18 the benefit of this technique of managing the power spectrum density (PSD) of the final signal in regards to the spectrum of each individual pulses composing the frequency hopping sequence can be seen. As depicted the PSD and pulses for sequences at each of the three different frequencies of 2.4 GHz, 3.5 GHz, and 4 GHz are depicted together with the 2/3/4 pulse sequence and its resulting PSD which fills the spectrum at around −58 dBm over the entire band. It would also be evident to one skilled in the art that the FPGA control could also be integrated within the CMOS Application Specific Integrated Circuit (ASIC) allowing further reductions in the prototype footprint.

The advantage of this approach over traditional filtering of the pulse is an emitted spectrum following the limits more closely. By using pulses with smaller bandwidth to fill the spectrum we have individual components with a more abrupt fall off, allowing them to be placed closer to the frequency limits and better filling the mask. It would also be evident that such an approach allows for rapid and simple changes to the sequence to re-adjust the IR-UWB transmitter to a different sub-mask or a different mask without re-designing any element within the system.

Figure 17:
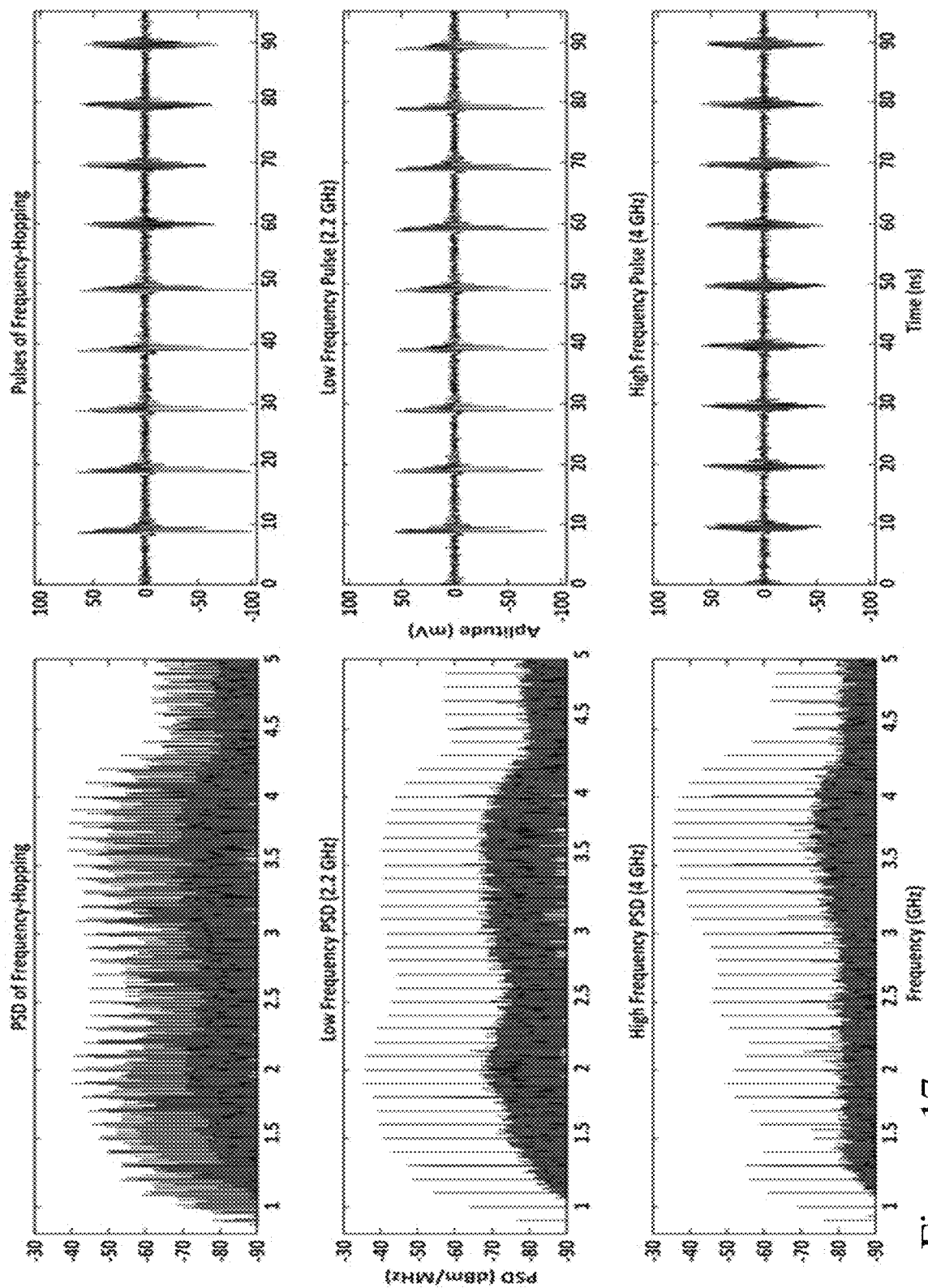
FIG. 17 depicts pulse amplitude and centre frequency tuning during frequency hopping operation of a UWB transmitter according to an embodiment of the invention for adjusting PSD at 2.4 GHz.
Figure 18:
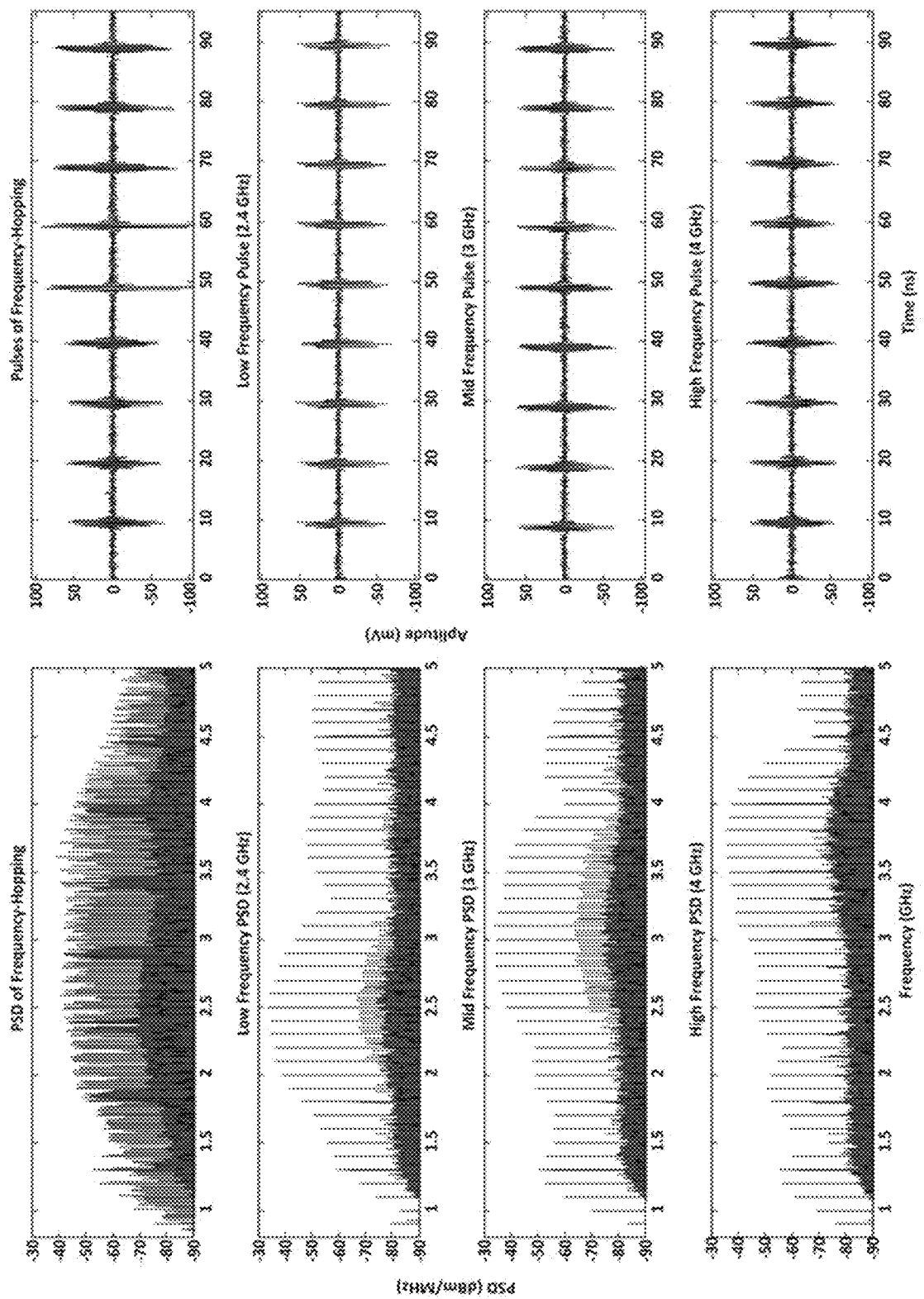
FIG. 18 depicts pulse amplitude and centre frequency tuning for a frequency hopping UWB transmitter according to an embodiment of the invention.

2G. Notch in the Transmitted Spectrum:

An IR-UWB according to an embodiment of the invention which uses a pulse train with frequency hopping can be customized to avoid a particular frequency. This application is similar to a cognitive radio by avoiding any transmission at frequencies whenever the risk of interference is present. If a communication system transmits at a frequency within the UWB band, measurements are taken to validate the ability of wide band transmission preventing the amplification of the signal at that frequency. To cover the UWB band and to reduce the risk of interference at an interfering frequency, pulse sequences are generated with the given frequency characteristic. As an example, to avoid transmitting at 2.4 GHz the pulses have the following characteristics; five pulses at 2.2 GHz and 2.5 ns length, followed by four pulses at 4 GHz and 2.3 ns length. FIG. 17 depicts the PSD and discrete pulse sequences at 2.2 GHz and 4 GHz together with the frequency hopping results. Also depicted are the combination pulse sequence and its PSD. Instead of obtaining a power spectrum density at the same amplitude of −40 dBm over the entire band width (1.5 GHz to 4 GHz); the result of the amplitude of the PSD at 2.4 GHz is −55 dBm, a reduction of 15 dB.

Figure 19A:
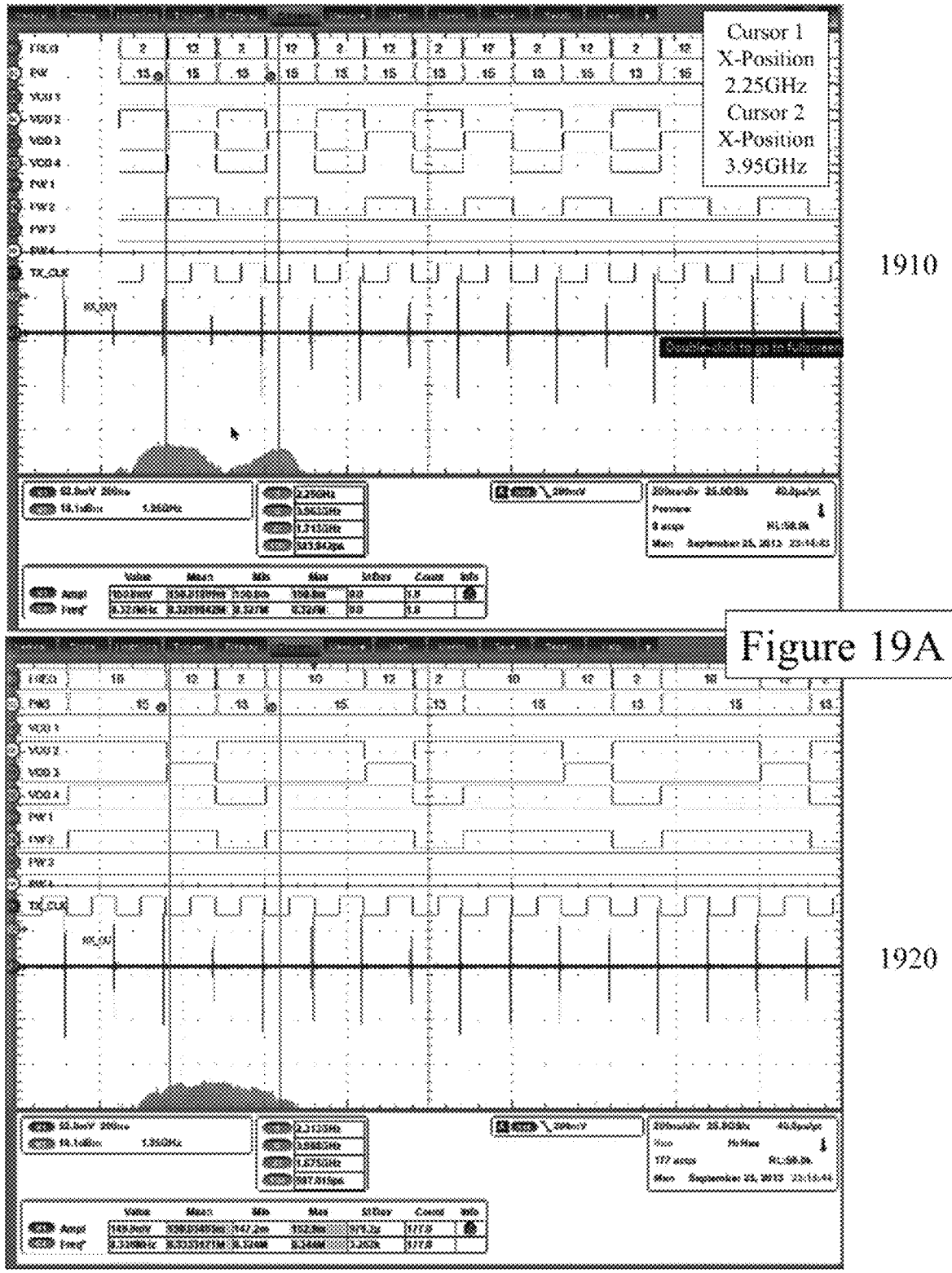
FIGS. 19A and 19B depict experimental results for a transmitter according to an embodiment of the invention.
Figure 19B:
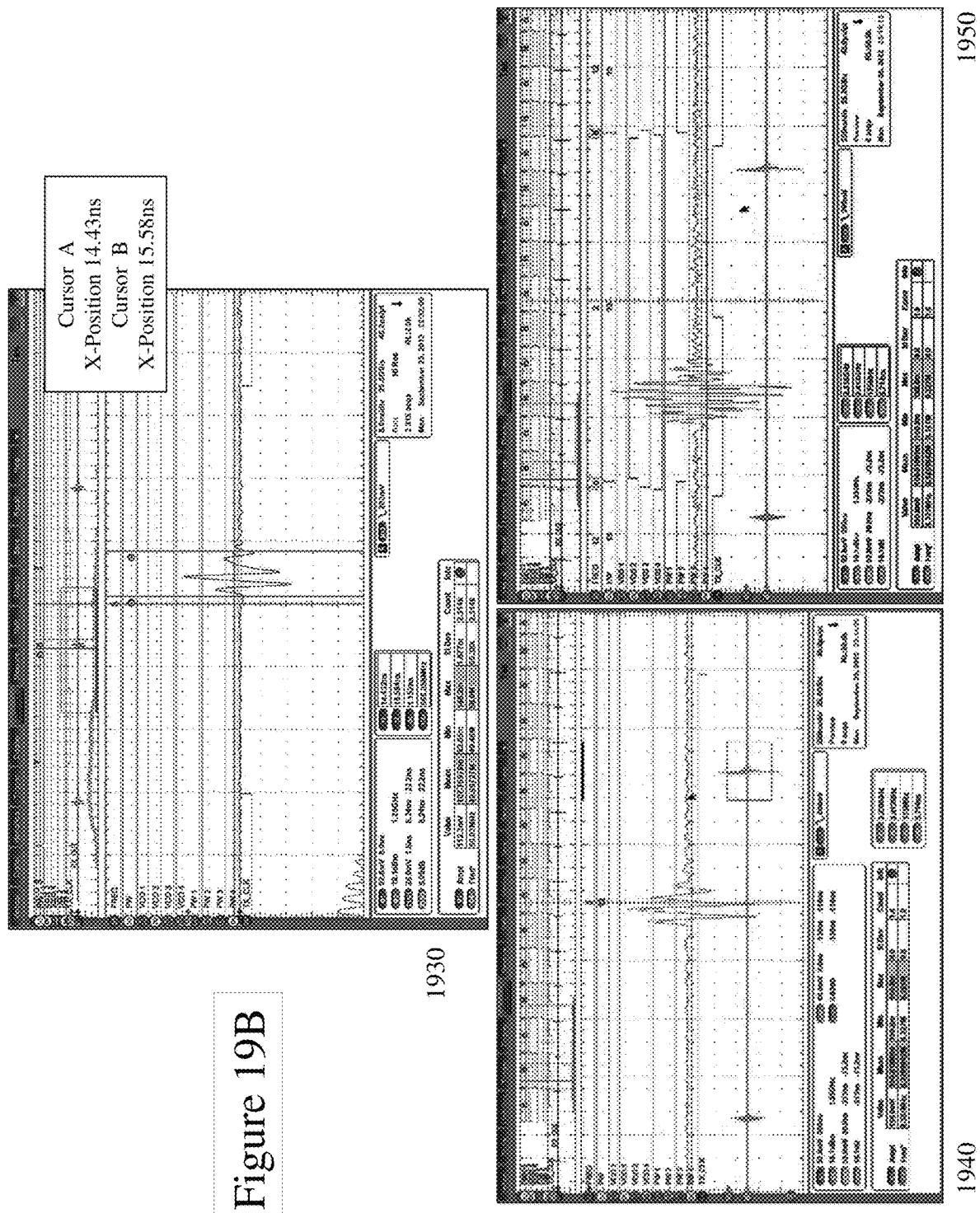

2H. Power Spectrum: Referring to FIGS. 19A and 19B additional test result data for an IR-UWB-Tx according to an embodiment of the invention are presented. First image 1910 in FIG. 19A depicts the PSD and pulse train for the IR-UWB-Tx when hopping between 2.2 GHz and 4 GHz for sequential pulses whereas second image 1920 shows the direct measurements displayed on the Tektronix Series 70000 oscilloscope for the same frequency hopping sequence as FIG. 18 with 2 pulses at 2.4 GHz, 3 pulses at 3.5 GHz, and 4 pulses at 4 GHz. Referring to FIG. 19B there are depicted first to third images 1930 to 1960 representing measured pulses at 2.2 GHz, 2.4 GHz, and 4 GHz respectively.

3. IR-UWB Receiver

Figure 20:
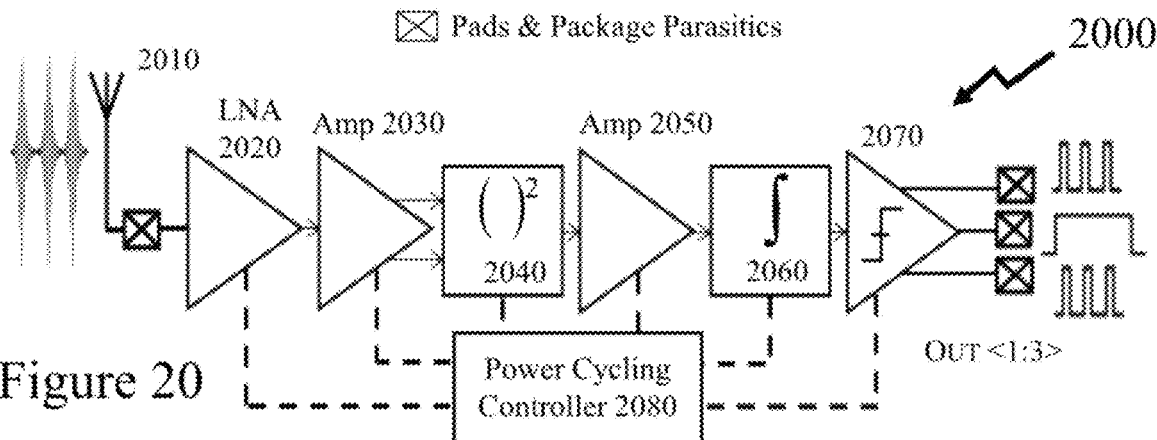
FIG. 20 depicts a block diagram of a UWB receiver according to an embodiment of the invention.
Figure 21A:
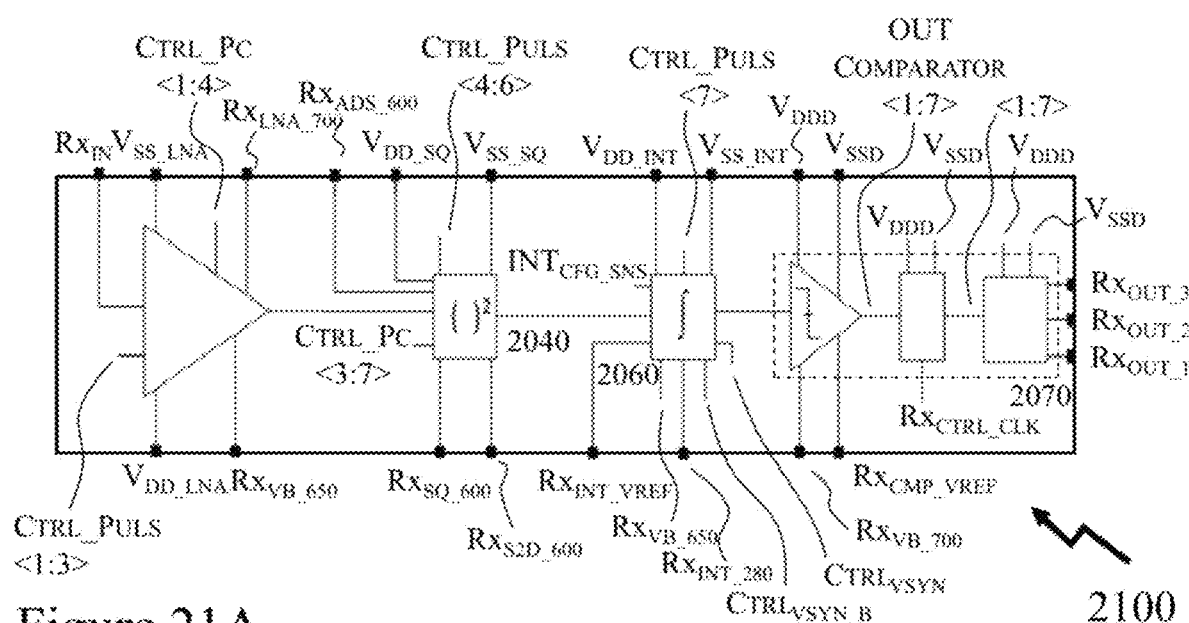
FIGS. 21A and 21B depict a system view of a UWB receiver according to an embodiment of the invention.
Figure 21B:
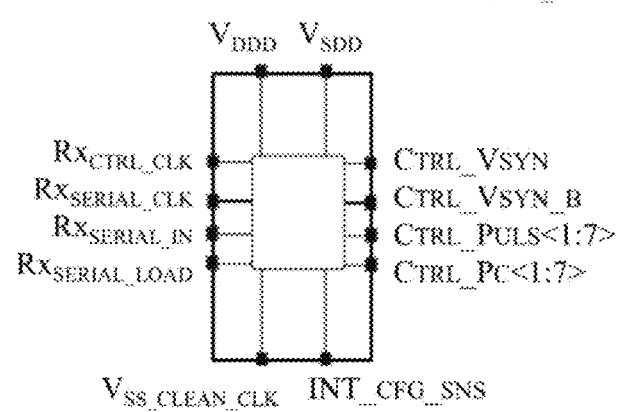

3A. Receiver Overview:

The architecture of an IR-UWB receiver 2000 according to an embodiment of the invention is depicted in FIG. 20. Accordingly, the signal from an IR-UWB transmitter is received via an antenna 2010 and coupled to a low noise amplifier (LNA) 2020 followed by first amplifier 2030 wherein the resulting signal is squared by squaring circuit 2040 in order to evaluate the amount of energy in the signal. The output of the squaring circuit 2040 is then amplified with second amplifier 2050, integrated with integration circuit 2060 and evaluated by a flash ADC 2070 to generate the output signals. Also depicted is Power Cycling Controller 2080 which, in a similar manner to the power cycling controller 220 of IR-UWB transmitter 200 in FIG. 2, dynamically powers up and down the LNA 2020, first and second amplifiers 2030 and 2050 respectively, squaring circuit 2040, and flash ADC 2070 to further reduce power consumption in dependence of the circuit's requirements. Referring to FIG. 21A the full signal view 2100 of the IR-UWB receiver 2000 is depicted whilst FIG. 21B depicts the full signal view of the control signal generator.

Based upon potential applications including, for example, embedded sensors requiring very low power and low complexity design as well as other power and cost limited system the receiver has to be configurable digitally using very simple control circuitry. Furthermore, the integration window has to be easily tunable considering the high sensitivity of energy detection receiver to proper integration window synchronization. Different modulation, data rates and burst length will also need to change the shape of the integration duty cycle and all the power management must properly keep in synchronization.

Figure 22:
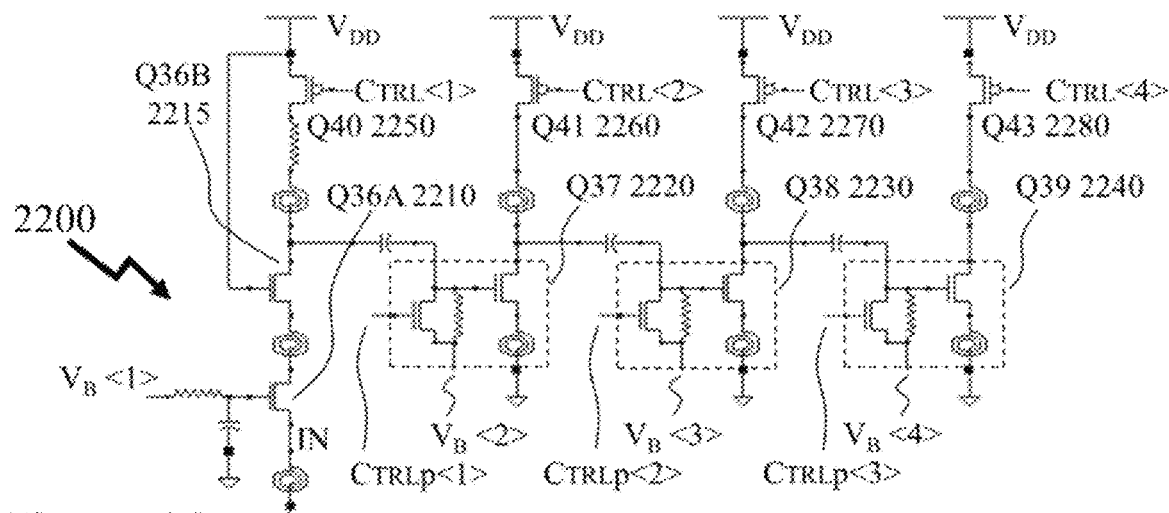
FIG. 22 depicts an amplifier chain for a UWB receiver according to an embodiment of the invention.
Figure 23:
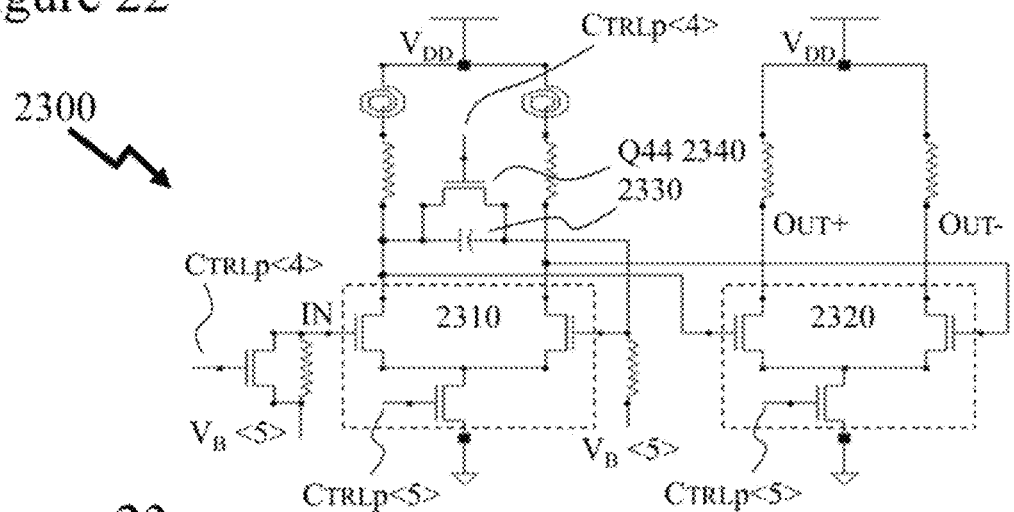
FIG. 23 depicts a single-ended to differential converter with differential buffer for a UWB receiver according to an embodiment of the invention.
Figure 24:
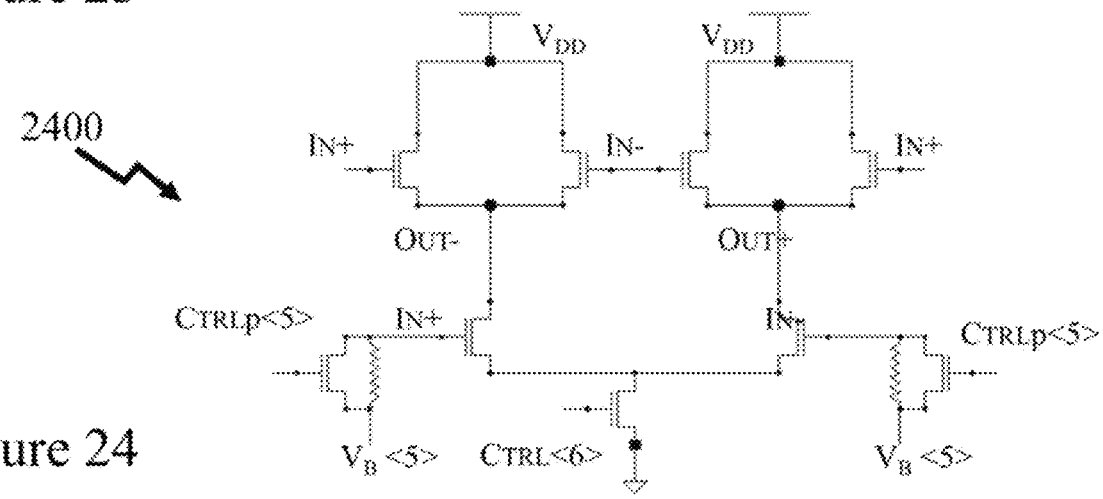
FIG. 24 depicts a squaring circuit for a UWB receiver according to an embodiment of the invention.

3B. Signal Amplification:

The first step in the signal path depicted within IR-UWB receiver 2000 is an amplification stage comprising LNA 2020 and first amplifier 2030. LNA 2010 is designed to match to the antenna allowing for package parasitics. Referring to FIG. 22 with circuit 2200 then the LNA 2010 is implemented using Q36A 2210 and Q36B 2215 whilst first amplifier 2030 comprises first to third common source stages Q37 2220, Q38 2230, and Q39 2240 respectively. In each instance control transistors Q40 to Q43 2250 to 2280 respectively are controlled with control signals CTRL<1> to CTRL<4> respectively whilst each of the first to third common source stages Q37 2220, Q38 2230, and Q39 2240 respectively are controlled via control signals CTRLp<1> to CTRLp<3> respectively. Ensuring the amplifier chain comprising first to third common source stages Q37 2220, Q38 2230, and Q39 2240 respectively maintains a constant gain over the full 3.1 GHz to 10.6 GHz bandwidth requires careful management of the gain per stage. Inductive peaking and source degeneration have been employed by the inventors on all stages to facilitate reaching the high operating frequency on the 0.13 µm CMOS technology. By choosing the proper inductors value, inductive peaking can be adjusted to achieve a nearly flat AC gain on all the stages leading to an overall flat gain response over the whole UWB bandwidth.

The first stage uses common gate architecture with a cascoded transistor, see for example Zhang et al in "A Low-Power, Linearized, Ultra-Wideband LNA Design Technique" (IEEE J. Solid-State Circuits, Vol. 44(2), pp. 320-330), wherein the load is composed of the inductor for the high frequency and a resistor to help the lower frequency gain. A large PMOS in triode mode is used to provide the required branch current under normal operation and cut it during idle time without interfering with frequency performance and adding only a low serial resistance. The parasitic capacitance added by the PMOS is included in the value choice of the load inductor. Another inductor is placed between the cascode and the common gate NMOS to create a pi network with the parasitics capacitance allowing these to be neutralized. The inductors used for the entire design described according to an embodiment of the invention are dual layer octagonal coil inductors connected serially. These offer a very small footprint for a given inductor value and a high self-resonant frequency value at the cost of a lower quality factor (Q). The lower Q is actually desirable as a side-effect by providing a larger bandwidth and a smaller peaking which both contribute to flatten the gain. The common gate architecture low input impedance facilitates matching to the 50Ω antenna and has been made to take into account the pads and bondwires parasitics.

The three following amplifier stage are simple common source stages with inductive source degeneration. The loading is provided by a PMOS in triode acting as a resistor for the low frequency gain and an inductor to use peaking to extend the bandwidth and maximal operating frequency. The PMOS double-up as a switch to cut the DC current during the power cycling of the circuit.

3C: Energy Detection:

Energy detection with IR-UWB receiver 2000 is achieved through squaring the signal with squaring circuit 2060. Amongst the simplest methods of squaring a signal is multiplying it by itself using a balanced mixer which also has the advantage of a higher linearity since the even harmonics are cancelled. As a balanced mixer requires a differential signal in order to create the mixed term, the corresponding differential signal needs to be created from the single-ended input using a single-end input/dual-end output (SEI-DEO) sub-circuit such as depicted with circuit 2300 in FIG. 23.

As depicted a first differential pair 2310 with an unbalanced input act as a single-ended to differential converter (S2D) whilst a second differential pair 2320 act as a differential amplifier acting as a buffer to help scale the currents to drive the squaring circuits larger input gate capacitances. The S2D uses a capacitor 2330 to generate feedthrough between the negative output and the fixed common mode input transistor to create a pseudo-differential input and improve the phase and amplitude of the generated differential signals. Inductive loading of the differential pair is also used to achieve flat gain on the entire UWB spectrum.

Both the unbalanced amplifier and the buffer are designed to be power cycled by modulating the biasing of the tail source. The control signal CTRLp<5> changes the biasing to the ground when the circuit is idle, cutting the biasing current of the differential pair. Since the input node take some time to settle after powering up out of the idle state, the feedthrough capacitance has an adverse effect on the settling speed of the circuit. A bypass transistor Q44 2340 driven by CTRLp<4> allows removal of the voltage difference during power up, placed in parallel to the capacitor 2330, helping to settle the outputs to the common DC output level.

The mixing circuit 2400 itself is modified from an unloaded double balanced Gilbert cell but the output is taken under the current steering part. Optionally, any circuit between a squarer or a current redresser may be employed, but squaring helps discriminate the signal from the lower amplitude noise. This configuration represents a compromise between a true signal squaring and the output bandwidth. Squaring result in part of the signal's energy being frequency doubled, which mean proper mixing would require outputting signal component up to 21.2 GHz. Achieving a large bandwidth Gilbert cell mixer running at these frequencies would require too much power for most UWB purposes. Using the current steering circuit creates a load that is a function of the signal. Since the difference in the tail current of both current steering pair is also a function of the signal where the square value of the signal dominates we have an output voltage which is between a full squaring and a linear current redresser. The imperfect mixing actually help keep the operating frequency in a reasonable bandwidth by creating lot of energy at lower frequency inter-modulation products while still discriminating a stronger signal from the lower power noise. The circuit also goes into power cycling by cutting the main tail current while idle like the SEI-DEO sub-circuit depicted as circuit 2300 in FIG. 23.

Figure 25:
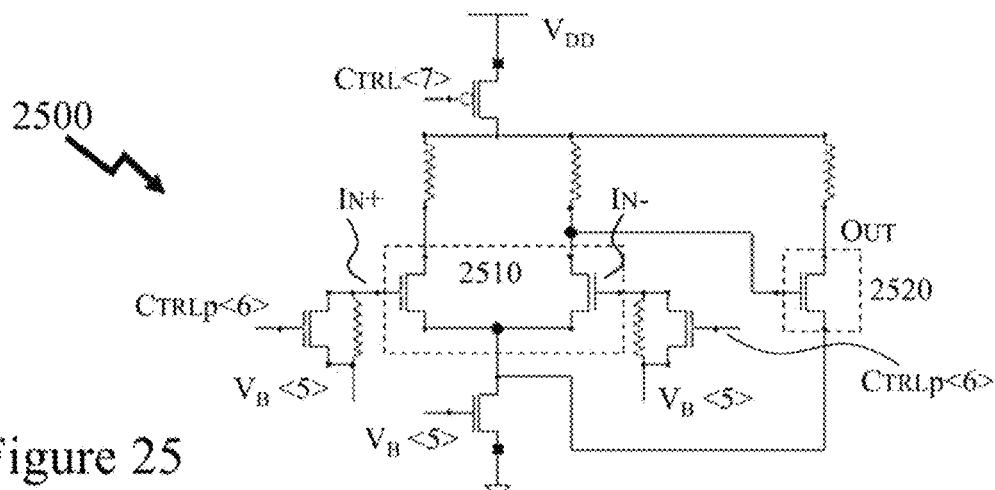
FIG. 25 depicts differential to single-ended converter for a UWB receiver according to an embodiment of the invention.

Finally, a differential-ended input to single-ended output (DEI-SEO) converter as depicted by circuit 2500 in FIG. 25 is used to recover the single-ended signal. Within circuit 2500 is a differential pair 2510 with an unbalanced output and is followed by a common source amplifier 2520 acting as a buffer to regenerate the signal before integration. Common source amplifier 2520 being second amplifier 2050 in IR-UWB receiver 2000 in FIG. 2.

Figure 26:
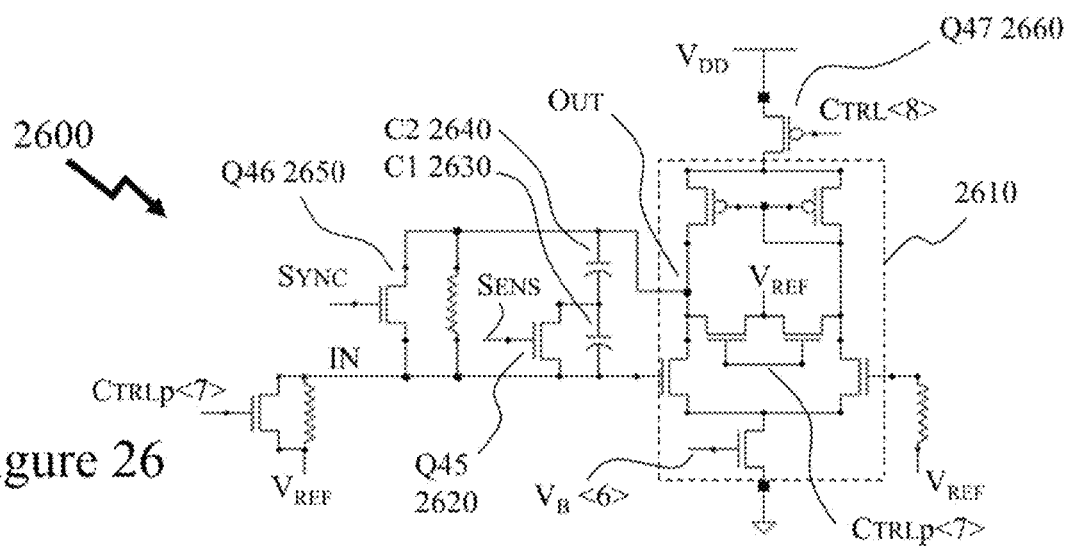
FIG. 26 depicts an integrator for a UWB receiver according to an embodiment of the invention.
Figure 27:
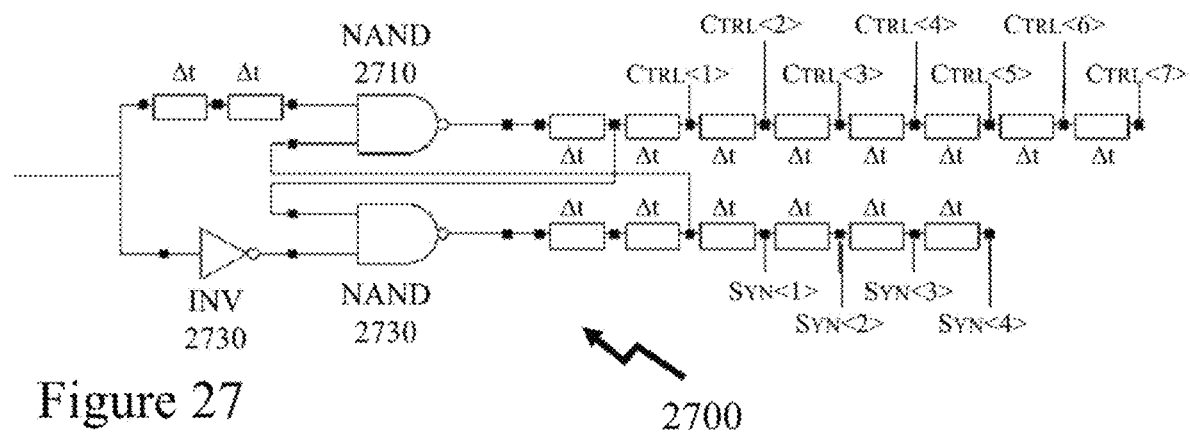
FIG. 27 depicts a control signal generating circuit for a UWB receiver according to an embodiment of the invention.

3D. Energy Integration:

As depicted in IR-UWB receiver 2000 following the second amplifier 2050 an integrator 2060 is implemented. Referring to FIG. 26 integrating circuit 2600 represents an integrator 2060 according to an embodiment of the invention. As depicted integrating circuit 2600 employs a transconductance amplifier 2610 with parallel RC feedback to create the integrating circuit 2600. The feedback capacitance value can be changed between two settings by the digital signal SENS signal acting via Q45 2620 to short the first capacitor C1 2630 leaving just the second capacitor C1 2640. The two capacitance values thus achievable gives two sensitivity settings which can be chosen depending on the strength of the signal. Another transistor Q46 2650 which is controlled via a SYNC control signals allows the input and output to be shorted together, essentially acting as a reset switch. This reset is used to control the integration windows and is held open only during the actual integration and closed when no pulse burst is expected. Power cycling is achieved by a PMOS Q47 2660 cutting the current in both branches of the integrator amplifier under action of CTRL<8>.

Since the integrator is very sensitive to variations on the output and input during the power up, care has been taken to stabilize the output values and input values during power down by starting the integrator in a known state. Since the signal generated from the energy detector circuit is only positive in respect to the analog reference, the integration direction is strictly positive. By analyzing the output levels of the integrator during a training sequence, it is possible to tune the reference level to offset the baseline noise power of the circuit and the background noise in the transmission channel.

3E. Energy Evaluation and Output:

The evaluation of the energy level is done using a 3-bit flash ADC 2070, depicted as being represented by the last 3 last blocks on the full system view in FIG. 21. The output level of the integrator can vary from the reference level to $V_{DD}$. The design constraints on the ADC are very low, since the result is more qualitative than quantitative. In order to have feedback on how much energy was detected during the integration window the eight discrete levels must be relatively equally spaced and strictly increasing. A good approximation of this requirement can be achieved using integrated resistors to generate the proper references voltage for the comparators in the flash ADC. The end value is read into flip-flops clocked on the ending edge of the integration window signal, allowing the comparator to be power cycled between readings.

Beside actual detection, having qualitative information on the strength of the detection value can be used to assess the quality of the detection and adjust future integration upon the result. The most straightforward use is to set a detection threshold of energy to account for the integrated noise power and reduce the number of false positives. The average noise energy can be easily determined by integrating during a time where we know there is no data being transmitted, such as for example during a training sequence. This integrated noise can also be offset by reducing the integration reference voltage like discussed in the integrator section.

A minimum detection threshold is very useful, but looking at the maximum integrated values can also be used to set the integrator sensitivity. A powerful signal will tend to saturate the integrator quickly, especially if multiple pulses are involved per symbol. During longer integrations, reducing the sensitivity of the integrator will increase the absolute difference between the signal power and the background noise.

In many instances, a training sequence can be employed to achieve synchronization. Unlike transmitters which are aware of the moments where there is a transmission or not and can easily power cycle down between pulses or symbols, the receiver needs to achieve a synchronization with the transmitter before making full use of the power cycling. Further correct detection of OOK or PPM signal requires listening exactly during the transmission window of the pulses in order to assess if pulses where present or not.

Within the prior art research into correct synchronization sequences has been reported and in some instances these sequences are now fixed into the different UWB standards. When unsynchronized, the receiver can listen at random intervals and try to detect the synchronization sequence. Once energy is detected, since the integration is strictly increasing, a binary search around the first hit can be done to determine the timing yielding the most energy. The precision of the synchronization is determined by the ADC resolution, the length of the transmitted burst of pulse and is limited by the ability of the baseband circuit to generate the integration windows. For example, using a 10 ns burst with the 3 bit ADC, the maximum synchronization accuracy is 1.25 ns. Achieving the maximum synchronization accuracy depends on the ability of the baseband to generate windows with the proper offset.

3F. Configuration, Timing and Energy Management:

Within the embodiments of the invention described within this specification and implemented in current prototypes, configuration is performed using a serial data stream. Although reading is done in parallel of all the bits at once in order to avoid changing configuration while the configuration bits are pushed through the serial line. The data bits include the sensitivity of the integrator and various power cycling controls. The IR-UWB receiver (IR-UWB-Rx) circuit has the ability, depending on these bits, to activate or deactivate power cycling of every component independently or activate/deactivate it for the whole chip.

IR-UWB-Rx according to an embodiment of the invention exploit a non-overlapping clock generator (NO-Clock-Gen) 2700 to generate all the power cycling control signals and the integration window from a single template waveform such that the baseband circuit of the IR-UWB-Rx does not need to generate these. This waveform is the only one needed from the baseband circuit and is slightly longer than the integration window itself to accommodate some initial power up time. This ensures that the power cycling signals and the integration window are always properly related to one another. As depicted NO-ClockGen 2700 comprises first NAND gate 2710 whose output is coupled to a first array 2740 of delay elements, each of delay D=Δt, to generate the control signals CTRL <1>,CTRL <2>, CTRL <3>, CTRL <4>, CTRL <5>, CTRL <6>, CTRL <7> after delays of 2Δt,3Δt,4Δt,5Δt,6Δt,7Δt,8Δt respectively. The output of first NAND gate 2710 after the first delay element in the first array 2740 is fed to an input of second NAND gate 2720 whose output is coupled to a second array 2750 of delay elements, each of delay D=Δt, to generate the control signals SYN <1>,SYN <2>, SYN <3>, SYN <4> after delays of 3Δt,4Δt,5Δt,6Δt respectively. The output of the second NAND gate 2720 is fed back to the input of the first NAND gate 2710 after a delay of 2Δt. The other inputs of first and second NAND gates 2710 and 2720 respectively being coupled to an input via a delay of 2Δt and an inverter 2730 respectively.

All circuits within the IR-UWB-Rx are powered up in sequence to avoid any voltage changes rippling through the circuit and affect the integrator 2060. To reduce process variation impact, most components are decoupled and biased independently. However, this can create problems during power down where the voltage difference at the decoupling capacitor is different than during regular operation. The voltage difference needs to be restored quickly, but most of the circuits have very high impedance output and inputs. In order to accelerate the recovery from power down, all biasing resistor have a parallel NMOS transistor. These transistors are opened briefly by a pulse CTRLp as indicated in FIGS. 22 to 26 respectively and are generated from the component's CTRL signals edge. When the pulse is active the transistor creates a lower impedance path to the voltage source. This significantly hastens the settling time for a little extra logic on the CTRL signal.

Figure 28A:
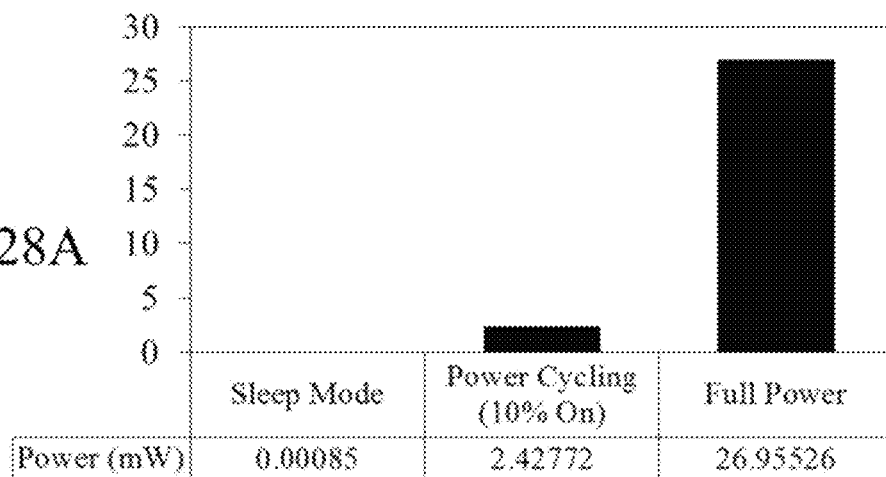
FIGS. 28A and 28B depict the reduced power consumption of a UWB receiver according to an embodiment of the invention.
Figure 28B:
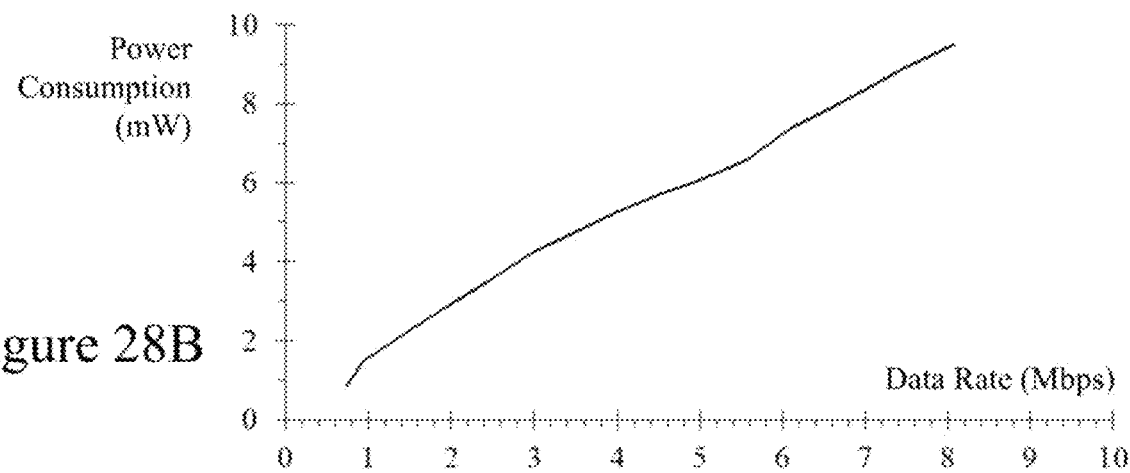

4. IR-UWB Receiver Measurements 4.1 Power Consumption:

Referring to FIGS. 28A and 28B the power consumption of an IR-UWB-Rx according to an embodiment of the invention is depicted where at full power the IR-UWB-Rx consumes 27 mW whilst in sleep mode it consumes approximately 1 µW. Accordingly, with power cycling at power on levels of 10% the IR-UWB-Rx consumes 2.42 mW. Also as evident in FIG. 28B the power consumption with full power cycling varies from approximately 1 mW at 0.8 Mbps up to approximately 9 mW at 7.8 Mbps.

When combining the power consumption data of FIGS. 28A and 28B with FIGS. 8A and 8B for the IR-UWB-Tx then Table 2 summarises the power consumption of an IR-UWB transceiver under various conditions.

TABLE 2

| | IR-UWB Transceiver Power Consumption | | |
|---|---|---|---|
| Mode | Tx (mW) | Rx (mW) | IR-UWB Transceiver (mW) |
| Sleep | 0.094 | 0.001 | 0.095 |
| 10% | 2.994 | 2.428 | 5.426 |
| 100% | 26.330 | 26.955 | 53.285 |

Figure 29:
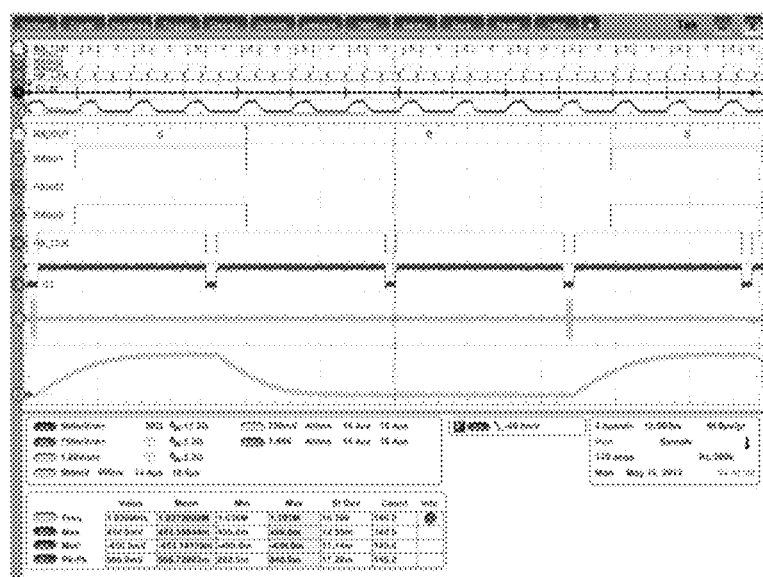
FIGS. 29, 30A and 30B depicted experimental results for a receiver according to an embodiment of the invention.
Figure 30A:
Figure 30B:
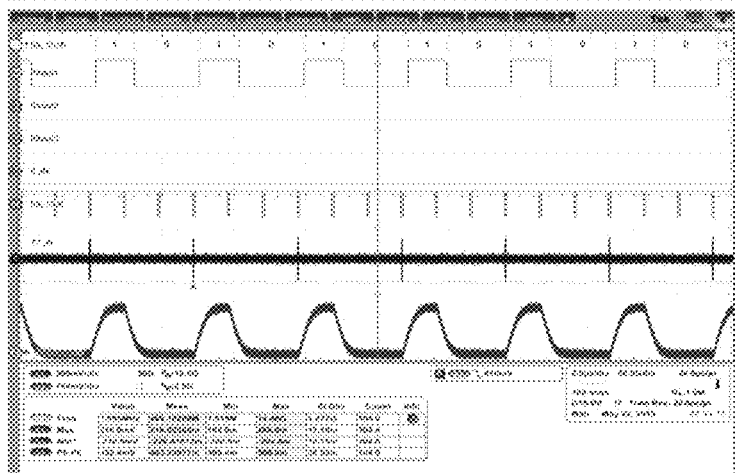

4.2 Pulse Performance:

Referring to FIG. 29 there is depicted the measured performance of an IR-UWB-Rx according to an embodiment of the invention whilst FIGS. 30A and 30B depict operation of the IR-UWB under varying received signal levels. In each instance it can be seen that the output is a received bit in response to receipt to a pulse upon the rising edge of the Rx_OUT3 signal.

5. IR-UWB Transceiver

Figure 31:
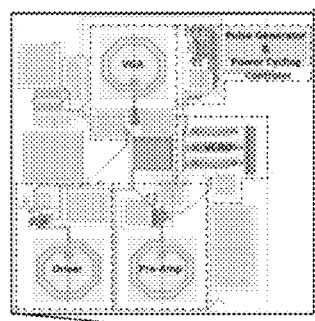
FIG. 31 depicts a CMOS integrated circuit implementation for a transmitter and receiver pair according to an embodiment of the invention.
Figure 31:
Figure 31:
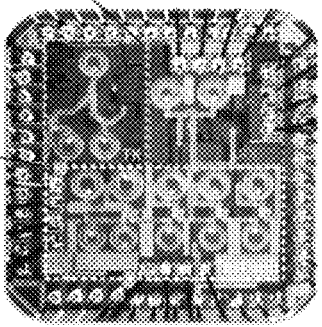
Figure 31:
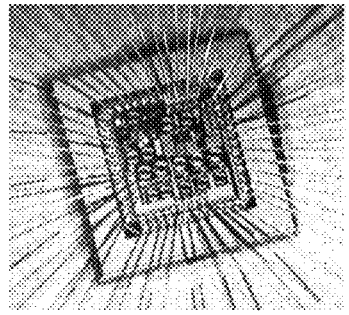

Referring to FIG. 31 there are first and second optical micrographs 3110 and 3120 for a CMOS IR-UWB transceiver according to an embodiment of the invention. Third image 3130 depicts the IR-UWB-Tx discretely whilst fourth image 3140 presents the IR-UWB-Tx circuit layout schematic where the Pre-Amplifier 440 if the DCRO 240, Driver 260, VCRO (DCRO) 240, VGA 250 and Pulse Generator 230—Power Cycling Controller 220 portions are identified.

Accordingly, it would be evident that embodiments of the invention allow for low power IR-UWB transmitters with on-demand oscillator allowing an IR-UWB transmitter to exploit spread-spectrum frequency and bandwidth hopping techniques to generate an output PSD conforming to a predetermined regulatory specification and/or mask as well as dynamic management of the PSD to accommodate variations in interference, other transmitters, etc. Similarly, IR-UWB receivers according to embodiments of the invention present a low complexity receiver solution accommodating IR-UWB transmitters operating with a range of non-phase sensitive protocols.

Further with dynamic power control discrete IR-UWB transmitters, IR-UWB receivers, and IR-UWB transceivers according to embodiments of the invention support deployment of personal area networks, body area networks, localized electronic device interconnections, etc. within a wide range of applications from sensors through to man-machine interfaces in civil, commercial, and military environments. With low duty rate powered operation of an IR-UWB receiver a device incorporating an IR-UWB transceiver may await detection of a wireless "wake" signal. Similarly IR-UWB transmitters and transceivers may dynamically manage power based upon the requirements to transmit data or not as well as factors such as the required rate and range of the transmitted signals.

6. IR-UWB Transmitter with Biphasic Phase Scrambling

6A. Transmitter Overview:

Within the results presented supra in respect of FIGS. 13 and 16-18 the spectral profiles of IR-UWB transmitters according to embodiments of the invention contain spectral lines that are apparent even with frequency scrambling. These spectral lines are present within the theoretical simulations performed by the inventors as depicted in first spectral plot 3300 in FIG. 33. However, the inventors through further theoretical simulations identified that if biphasic phase scrambling is introduced into the IR-UWB transmitter then the spectral lines can be reduced significantly as evident from second image 3350 in FIG. 33.

Figure 32:
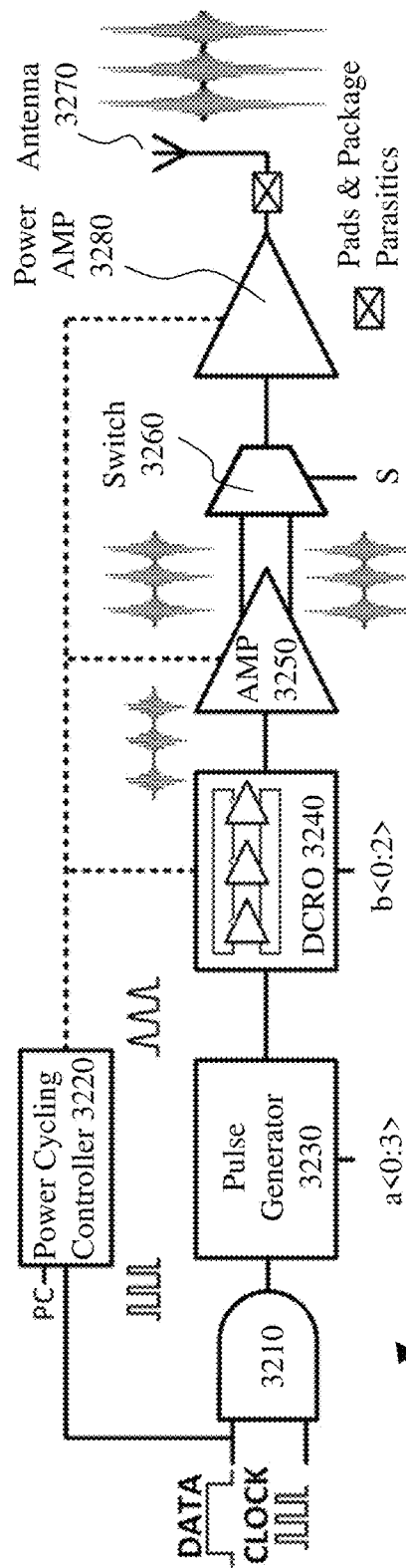
FIG. 32 depicts a block diagram of a UWB transmitter according to an embodiment of the invention supporting biphasic phase scrambling.

Accordingly, referring to FIG. 32 there is a block diagram 3200 of a UWB transmitter according to an embodiment of the invention supporting biphasic phase scrambling. In comparison to the IR-UWB transmitter 200 in FIG. 2 for an IR-UWB according to embodiments of the invention without biphasic phase shifting rather than being composed of five main blocks plus the antenna the Biphasic Phase Shifting IR-UWB (BPS-IR-UWB) transmitter comprises 6 main blocks. First a programmable impulse is produced by a pulse generator 3230 at clocked intervals when the data signal from AND gate 3210 is high based upon control signals presented to the AND gate 3210. The pulses from the pulse generator 3230 are then up-converted with a programmable multi-loop digitally controlled ring oscillator (DCRO) 3240. The output from the DCRO 3240 is then coupled to a dual-output amplifier (VGA) 3250 both in order to compensate for any frequency dependency of the pulse amplitude but also to generate dual phase shifted output signals that are coupled to a switch 3260 which selects one of the two signals to couple to the output power amplifier (driver) 3280 under the action of the switch control signal "S" applied to the switch 3260. Note that a similar phase selection scheme could be implemented by affecting the startup conditions o DCRO 3240 in order to provide the two phases. This would preclude the need for switch 3260 at the cost of an added control startup condition control signal on DCRO 3240.

Figures 34, 35, 36:
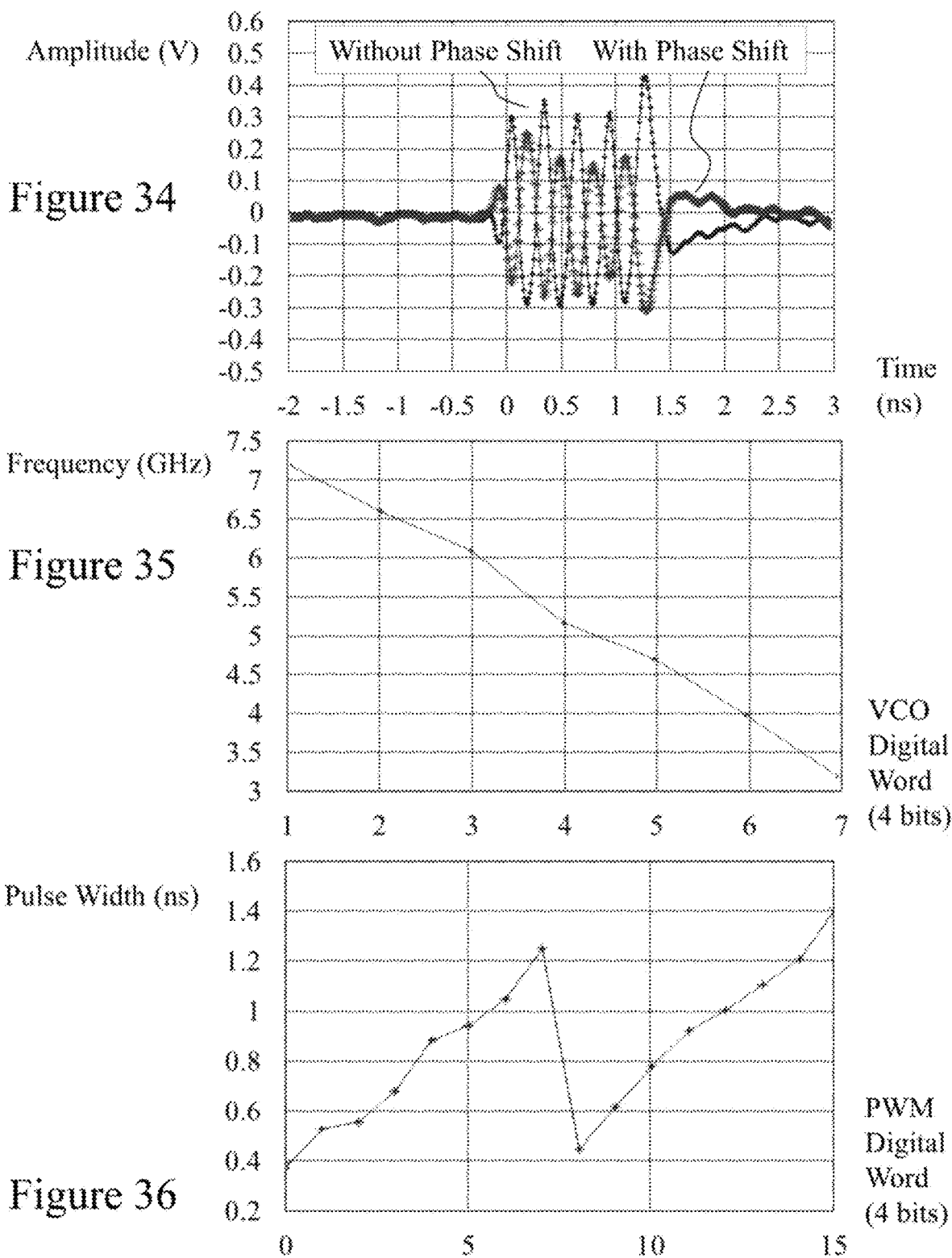
FIG. 34 depicts the pulse shapes for a UWB transmitter employing biphasic phase scrambling with and without phase shift according to an embodiment of the invention.
FIGS. 35 and 36 depict the pulse frequency and pulse width for a UWB transmitter employing biphasic phase scrambling according to an embodiment of the invention with increased frequency range to the design providing similar data in FIGS. 10 and 11 respectively.

The output power amplifier 3280 feeds the antenna 3270, overcoming typical package parasitics, such as arising from packaging the transceiver within a quad-flat no-leads (QFN) package. In order to reduce the power consumption of the BPS-IR-UWB transmitter represented by block diagram 3200 according to an embodiment of the invention a power cycling controller 3220 dynamically switches on or off these functional blocks when the data signal "PC" is low. Referring to FIG. 34 the pulse shapes for a BPS-IR-UWB transmitter with and without phase shift are depicted. Accordingly, a BPS-IR-UWB transmitter according to embodiments of the invention transmits pulses with or without phase shift based upon the control signal "S" applied to switch 3260. If this control signal is now fed from a random data generator or a pseudo-random data generator then the resulting pulses coupled to the antenna of the BPS-IR-UWB transmitter will be pseudo-randomly or randomly phase shifted.

Figure 37:
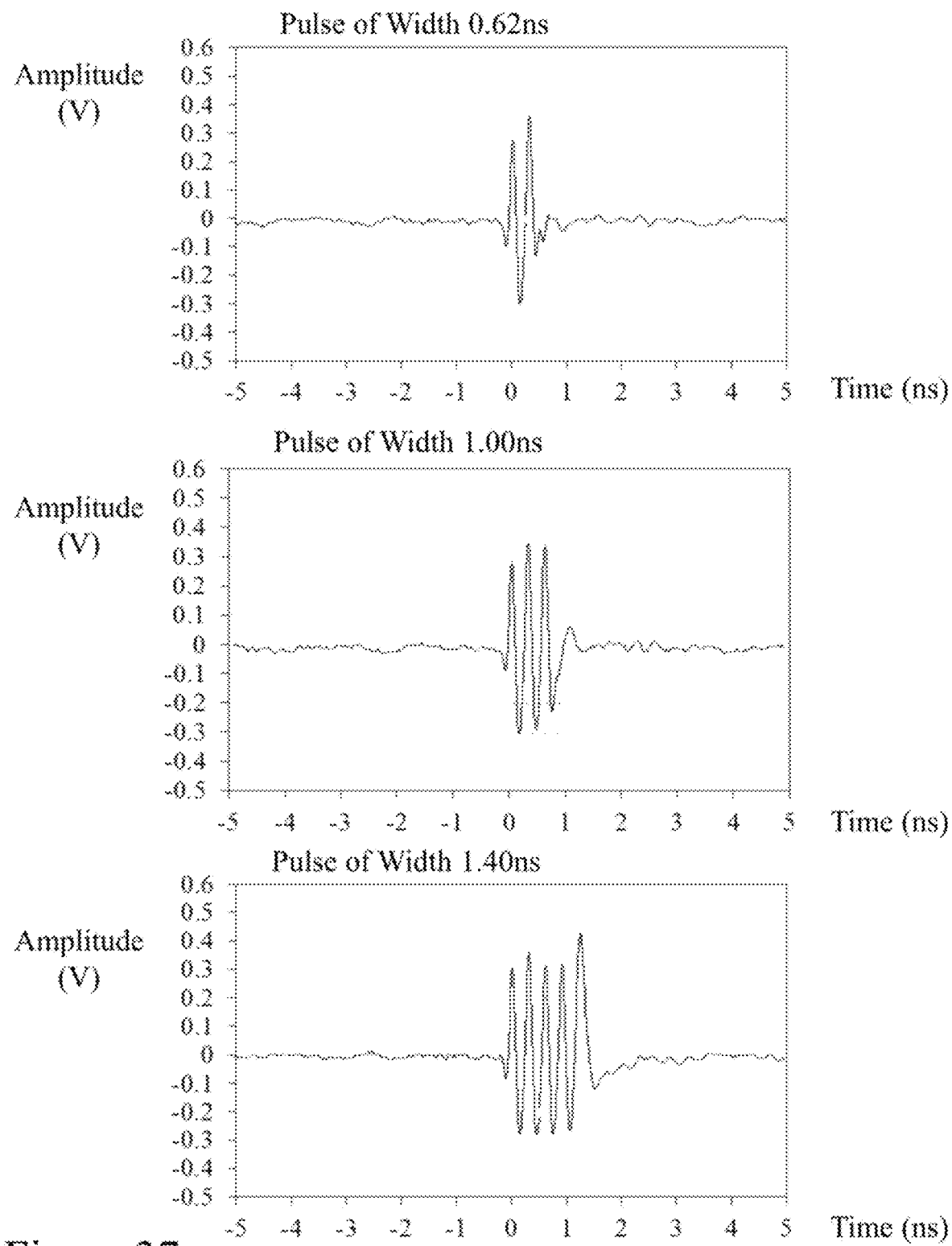
FIG. 37 depicts pulse measurements for a UWB transmitter employing biphasic phase scrambling according to an embodiment of the invention at three different control settings supporting shorter pulses and higher frequency operation than the design providing similar data in FIG. 14.

Referring to FIG. 35 there is depicted the pulse center frequency for all the bit sequences of the DCRO 3240 for a BPS-IR-UWB according to the design of the transmitter according to an embodiment of the invention depicted in FIG. 32. Due to improvements overall in the prototype UWB transmitters implemented by the inventors the frequency varies from approximately 3 GHz to approximately 7 GHz. Similarly, referring to FIG. 36 the transmitter pulse width of a BPS-IR-UWB according to the design of the transmitter according to an embodiment of the invention depicted in FIG. 32 for all bit sequences showing the measured pulse width varies from approximately 400 ps to approximately 1400 ps in two operation modes. FIG. 37 depicts the pulse shape obtained for three different width settings for a UWB transmitter employing biphasic phase scrambling according to an embodiment of the invention. The three pulse widths being 0.626 ns, e1.00 ns, and 1.40 ns respectively.

Figure 38:
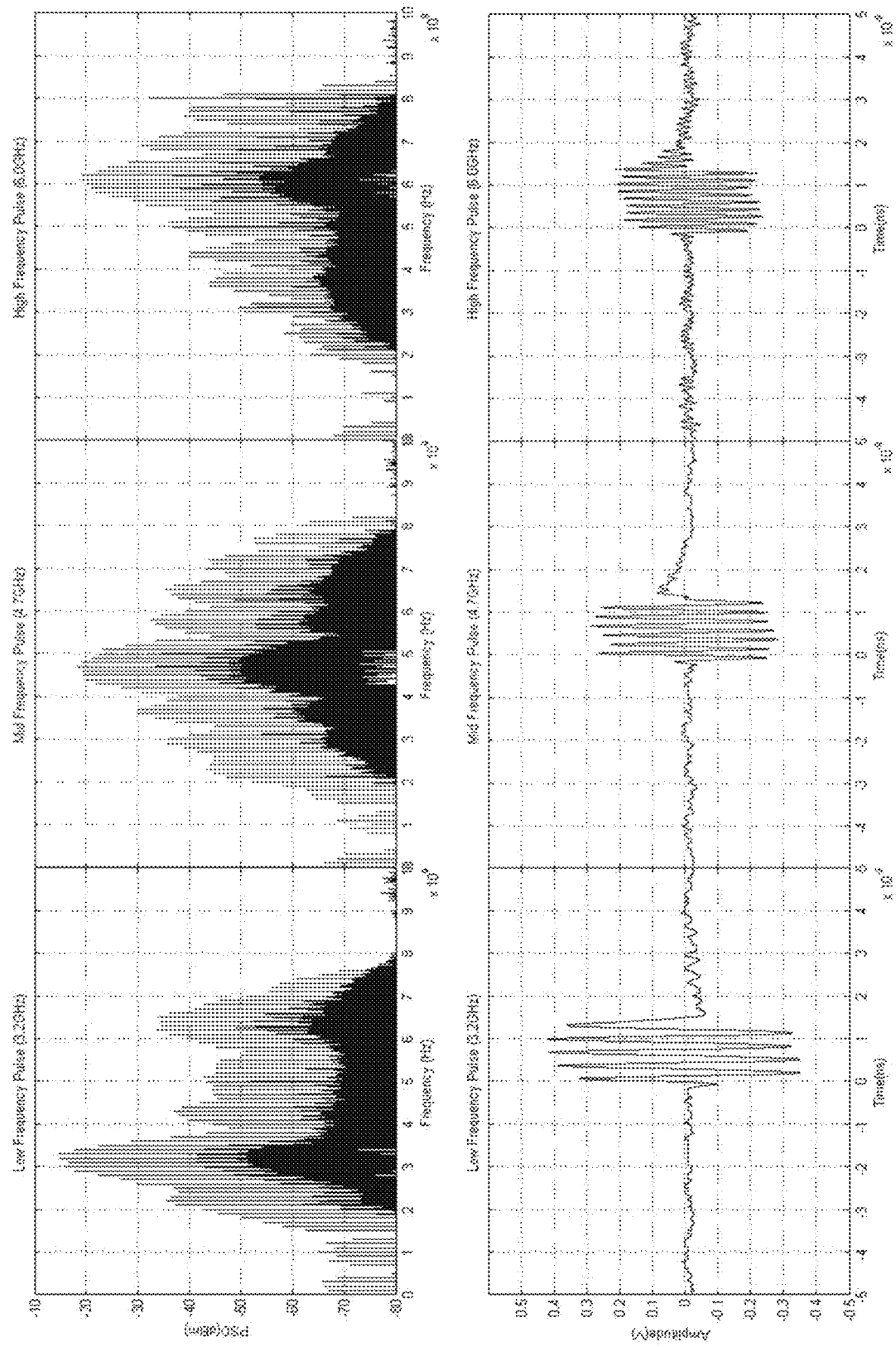
FIG. 38 depicts digitally controllable pulse shape and output power spectrum density under control tuning for a UWB transmitter employing biphasic phase scrambling according to an embodiment of the invention.
Figure 39:
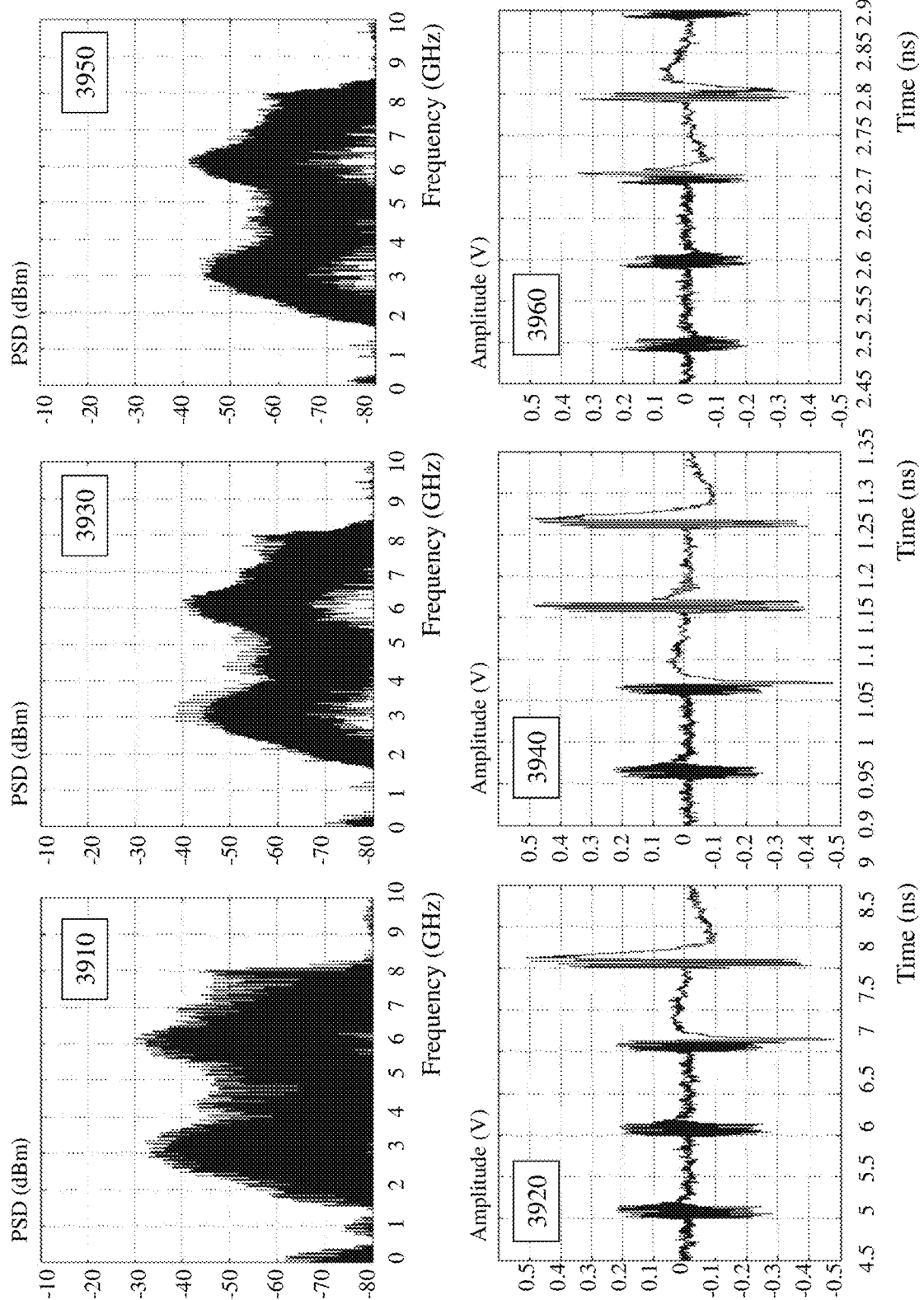
FIG. 39 depicts pulse amplitude and centre frequency tuning during frequency hopping operation of a UWB transmitter employing biphasic phase scrambling according to an embodiment of the invention.

Now referring to FIG. 38 there are depicted the digitally controlled pulse length and associated transmitter output power spectrum density measurements for a PBS-IR-UWB transmitter according to an embodiment of the invention under control tuning from a low frequency pulse generation (approximately 3.2 GHz), to a mid-frequency pulse (approximately 4.7 GHz), through to a high frequency pulse (approximately 6.0 GHz). Accordingly, as depicted in FIG. 39 the resulting power spectrum and pulse train for a single 3.2 GHz pulse followed by three 6 GHz pulses under three different operating conditions of a PBS-IR-UWB according to an embodiment of the invention. Similarly to what is shown in FIG. 17 for the IR-UWB embodiment of FIG. 2, FIG. 39 further illustrates the ability to omit transmitting within a given frequency band, specifically ~5 GHz in FIG. 39. First and second images 3910 and 3920 respectively representing the power spectrum and pulse sequence wherein there is no random frequency or phase sequencing during the generation and transmission. Third and fourth images 3930 and 3940 depict the power spectrum and pulse sequence wherein only a random frequency sequence is employed such as described supra in respect of an IR-UWB according to an embodiment of the invention such as depicted in FIG. 2 but with the PBS-IR-UWB transmitter according to an embodiment of the invention as depicted in FIG. 32. In this instance, therefore the switch control signal to the switch 3260 within the PBS-IR-UWB is set to one level and maintained. Finally, fifth and sixth images 3950 and 3960 depict the results for random frequency and random phase wherein the switch control signal to the switch 3260 within the PBS-IR-UWB is fed data to set its levels from a pseudo-random data generator.

Figure 33:
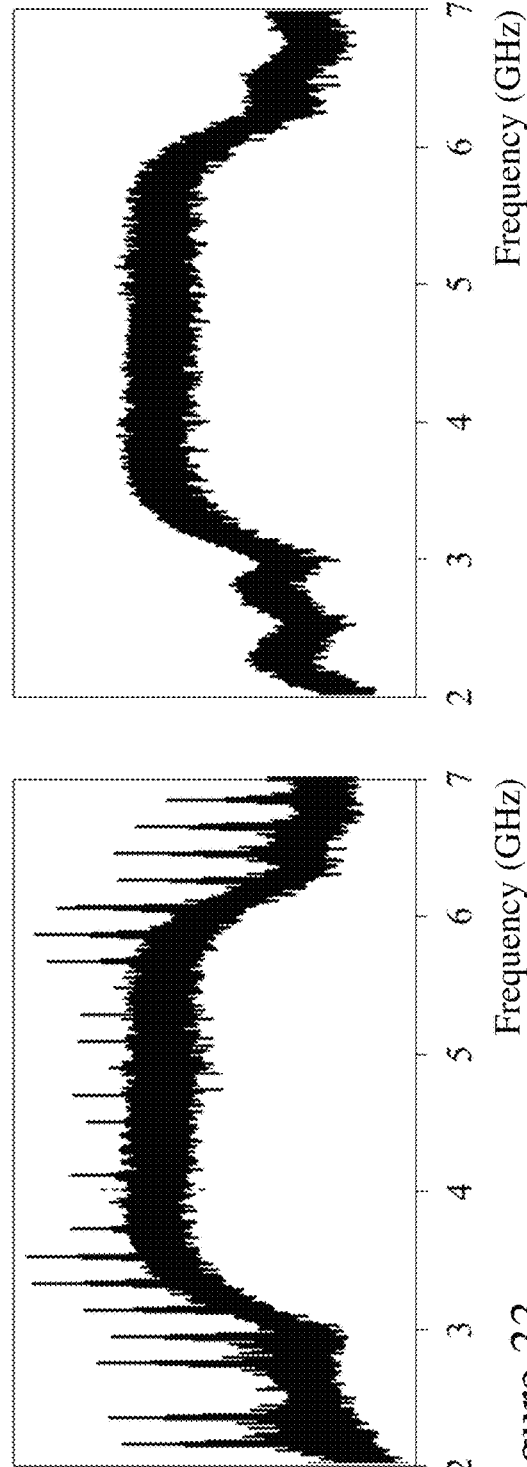
FIG. 33 depicts theoretical spectral profiles for UWB transmitters without and with biphasic phase scrambling.

Accordingly, it would be evident that when comparing first and third images 3910 and 3930 that the introduction of random frequency results in reduced spectral lines and that the further introduction of random phase shifting reduces the spectral lines even further as depicted in fifth image 3950 and as anticipated from the theoretical modelling presented and discussed in respect of FIG. 33. It can also be seen, in fifth image 3950, that with the pulse sequence of 3.2 GHz and 6 GHz pulses that the power transmitted between these around 5 GHz is reduced in comparison to that shown in FIG. 40 image 4050 where pulses at 4.7 GHz are introduced as well.

Figure 40:
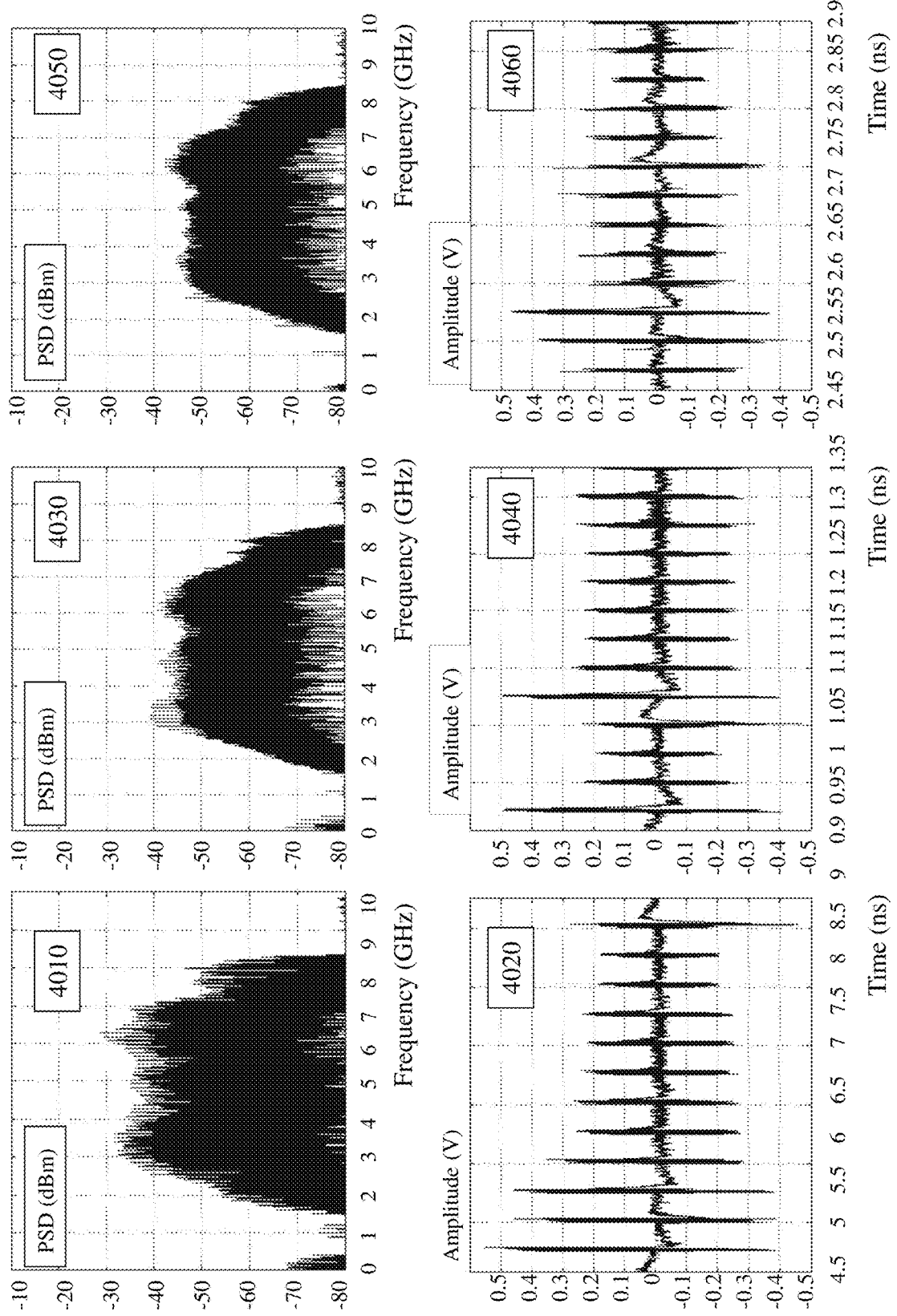
FIG. 40 depicts pulse amplitude and centre frequency tuning for a frequency hopping UWB transmitter employing biphasic phase scrambling according to an embodiment of the invention.

Now referring to FIG. 40 there are depicted the resulting power spectrum and pulse train for a PBS-IR-UWB according to an embodiment of the invention frequency hopping within the full frequency range as depicted in FIG. 35 from approximately 3 GHz to approximately 7 GHz. This is accomplished using a pulse train that includes frequencies of 3.2 GHz, (1 pulse) 4.7 GHz (2 pulses) and 6 GHz (3 pulses). First and second images 4010 and 4020 respectively representing the power spectrum and pulse sequence wherein there is no random frequency or phase sequencing during the generation and transmission. Third and fourth images 4030 and 4040 depict the power spectrum and pulse sequence wherein only a random frequency sequence is employed such as described supra in respect of an IR-UWB according to an embodiment of the invention such as depicted in FIG. 2 but with the PBS-IR-UWB transmitter according to an embodiment of the invention as depicted in FIG. 32. In this instance, therefore the switch control signal to the switch 3260 within the PBS-IR-UWB is set to one level and maintained. Finally, fifth and sixth images 4050 and 4060 depict the results for random frequency and random phase wherein the switch control signal to the switch 3260 within the PBS-IR-UWB is fed data to set its levels from a pseudo-random data generator. Accordingly, it would be evident that when comparing first and third images 4010 and 4030 that the introduction of random frequency results in reduced spectral lines and that the further introduction of random phase shifting reduces the spectral lines even further as depicted in fifth image 4050 and as anticipated from the theoretical modelling presented and discussed in respect of FIG. 33.

Figure 41:
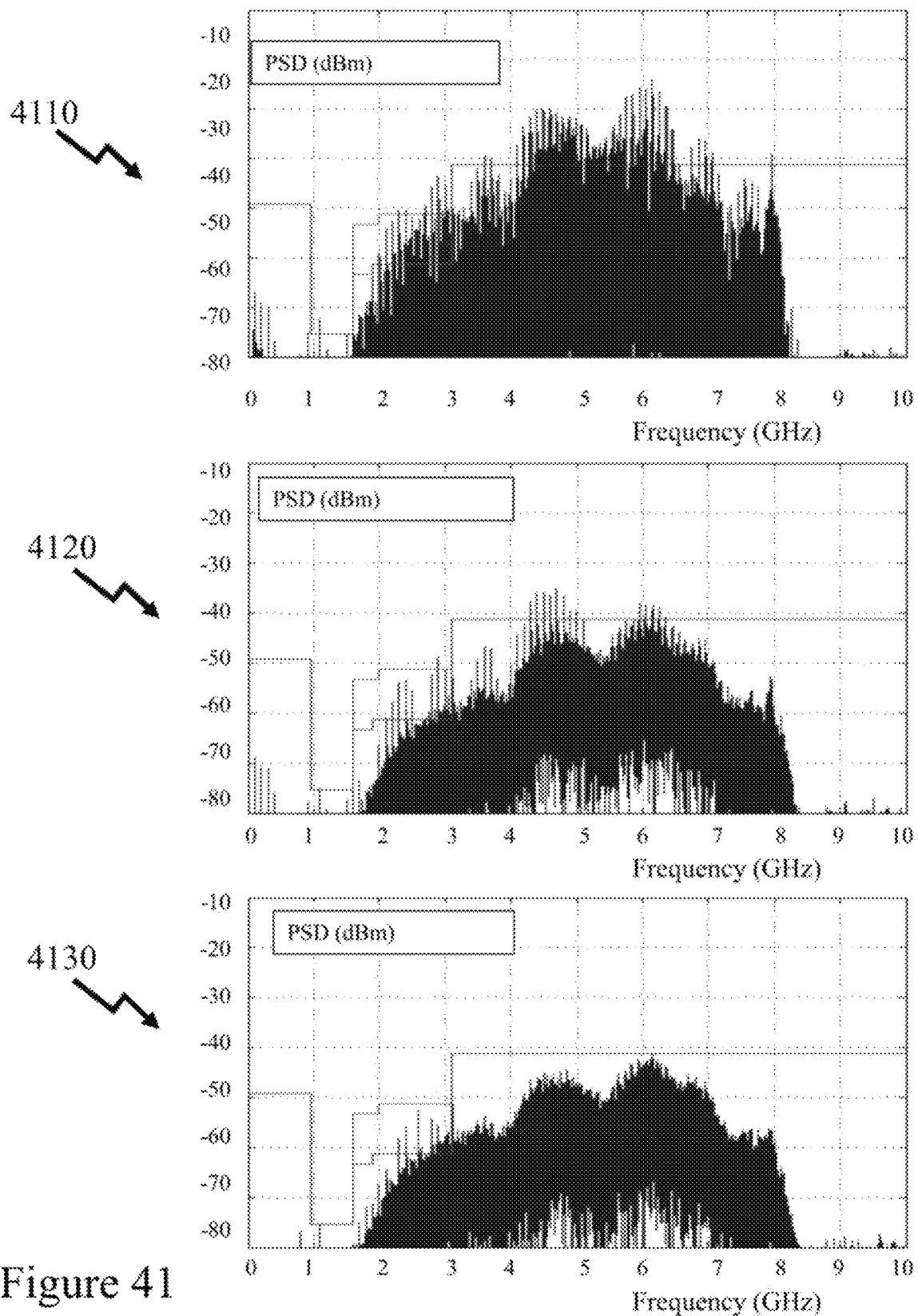
FIG. 41 depicts spectral output shaping of a UWB transmitter employing biphasic phase scrambling according to an embodiment of the invention against a UWB power-frequency mask.

Now referring to FIG. 41 depicts spectral output shaping of a UWB transmitter employing biphasic phase scrambling according to an embodiment of the invention against a UWB power-frequency mask. In each of first to third images 4110 to 4130 respectively a pair of UWB masks are depicted establishing a maximum power level over predetermined frequency ranges as listed in Table 3.

TABLE 3

| | | UWB Masks | |
| Band | Frequency Range (GHz) | UWB Mask 1 Max. Signal Power (dBm) | UWB Mask 2 Max. Signal Power (dBm) |
| --- | --- | --- | --- |
| A | 0-950 MHz | −49 | −49 |
| B | 950 MHz-1.6 GHz | −75 | −75 |

TABLE 3-continued

| | | UWB Masks | |
| Band | Frequency Range (GHz) | UWB Mask 1 Max. Signal Power (dBm) | UWB Mask 2 Max. Signal Power (dBm) |
| --- | --- | --- | --- |
| C | 1 | 1.6 GHz-1.9 GHz | −63 | |
| | 2 | 1.6 GHz-2.0 GHz | | −53 |
| D | 1 | 1.9 GHz-3.15 GHz | −61 | |
| | 2 | 2.0 GHz-3.15 GHz | | −51 |
| E | | 3.15 GHz-10 GHz | | −42 |

Accordingly, first image 4110 represents the power spectrum wherein there is no random frequency or phase sequencing during the generation and transmission of data. Third image 4120 depicts the power spectrum wherein only a random frequency sequence is employed such as described supra in respect of an IR-UWB according to an embodiment of the invention such as depicted in FIG. 2 but with the PBS-IR-UWB transmitter according to an embodiment of the invention as depicted in FIG. 32. In this instance, therefore the switch control signal to the switch 3260 within the PBS-IR-UWB is set to one level and maintained. Finally, third image 4130 depicts the results for random frequency and random phase wherein the switch control signal to the switch 3260 within the PBS-IR-UWB is fed data to set its levels from a pseudo-random data generator. Accordingly, it can be seen that with the reduction of spectral lines as we progress from first to third images 4110 to 4130 respectively that spectrum shaping can be implemented together with spectral line reduction from random phase. As depicted the power spectrum is compliant with one UWB mask and apart from a couple of spectral lines below 3 GHz is compliant to the other UWB mask. It is anticipated that adjustment of the frequency hopping and improving the match between the phase shifted and non-phase shifted signals will further reduce the spectral lines and further adjust the power spectrum.

Optionally within other embodiments of the invention the biphasic phase shifting may be replaced with multiphasic phase shifting (MPS) providing for a MPS-IR-UWB transmitter although the additional electronic and control complexity may limit application to specific devices and/or UWB applications.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of transmitting data comprising:
receiving data comprising a plurality of bits to be transmitted;
generating a plurality of wireless signals with a RF signal generator for coupling to an antenna for wireless transmission of the plurality of bits; and
controlling generation of the plurality of wireless signals by the RF signal generator with a control circuit; wherein
the control circuit controls the RF signal generator circuit such that each bit of the plurality of bits is represented by a wireless signal of the plurality of wireless signals;
each wireless signal of the plurality of wireless signals comprises a plurality N pulses generated by the RF signal generator wherein each pulse of the plurality of N pulses is at a predetermined frequency of a plurality M frequencies, has a predetermined amplitude, and has a predetermined pulse length;
the RF signal generator circuit employs biphasic phase scrambling of sequential pulses such that each pulse has either a first phase or a second phase and the biphasic phase scrambling is pseudo-random;
the RF signal generator circuit incorporates a dual output amplifier wherein a first output of the dual output amplifier has the first phase and a second output of the dual output amplifier has the second phase;
the first output of the dual output amplifier and the second output of the dual output amplifier are coupled to a switch; and
the switch selectively selects either the first output of the dual output amplifier with the first phase or the second output of the dual output amplifier with the second phase in dependence upon a pseudo-random control signal coupled to the switch.

2. The method according to claim 1, wherein
the control circuit allows dynamic setting of an emitted power spectrum from the antenna per bit of the plurality of bits.

3. The method according to claim 1, wherein
each sequential pulse of the plurality of N pulses is at a different frequency, amplitude and phase to at least one of an immediately preceding pulse of the plurality of N pulses and an immediately subsequent pulse of the plurality of N pulses;
the control circuit allows dynamic setting of an emitted power spectrum from the antenna per bit of the plurality of bits.

4. The method according to claim 1, wherein
the RF signal generator circuit generates the plurality of N pulses at the predetermined frequencies of the plurality M frequencies without up-conversion.

5. The method according to claim 1, wherein
the control circuit establishes an output power spectrum compliant with a mask of a plurality of masks and the employed mask of the plurality of masks are changed between a current bit of the plurality of bits and a subsequent bit of the plurality of bits;
the RF signal generator circuit generates the plurality of N pulses at the predetermined frequencies of the plurality M frequencies without up-conversion.

6. The method according to claim 1, wherein
the control circuit establishes an output power spectrum without filtering which does not overlap one or more predetermined frequencies associated within one or more predetermined wireless standards.

7. The method according to claim 1, wherein
the control circuit establishes an output power spectrum without filtering which comprises notches at one or more predetermined frequencies associated within one or more predetermined wireless standards.

8. The method according to claim 1, wherein
the control circuit allows dynamic setting of an emitted power spectrum from the antenna per bit of the plurality of bits;
$N \geq 2$ and $M > 2$;
M and N are integers;
a pulse repetition rate of the RF signal generator is determined in dependence of a clock frequency coupled to the RF signal generator;
the integer N depends upon a duration of a bit of the plurality of bits and the pulse repetition rate of the RF signal generator; and
the plurality N pulses are transmitted within the duration of the bit of the plurality of bits.

9. The method according to claim 1, wherein
the RF signal generator comprises at least a pulse generator generating pulses at a pulse repetition rate determined by a clock signal coupled to the pulse generator and a programmable digitally controlled ring oscillator operating over a frequency range covering the plurality M frequencies coupled to an output of the pulse generator;
the RF signal generator operates independent of any mixer and phase locked loop; and
the RF signal generator operates directly independent of any up-conversion of data being transmitted.

10. The method according to claim 1, wherein
the control circuit includes a power cycling controller comprising a plurality of non-overlapping signal generation circuits and employs a data signal and a transmit clock to determine when to power up or power down different predetermined portions of the RF signal generator;
each non-overlapping signal generation circuit of the plurality of non-overlapping signal generation circuits is coupled to one of the different predetermined portions of the RF signal generator and generates appropriate control signals to power up or power down that predetermined portion of the RF signal generator; and the plurality of non-overlapping signal generation circuits are timed to reduce impact on an output signal whilst reducing power consumption of the RF signal generator.

11. A transmitter comprising:

an input port for receiving data comprising a plurality of bits to be transmitted;

a RF signal generator for generating a plurality of wireless signals for coupling to an antenna for wireless transmission of the plurality of bits; and a control circuit for controlling generation of the plurality of wireless signals by the RF signal generator; wherein the control circuit controls the RF signal generator circuit such that each bit of the plurality of bits is represented by a wireless signal of the plurality of wireless signals;

each wireless signal of the plurality of wireless signals comprises a plurality N pulses generated by the RF signal generator wherein each pulse of the plurality of N pulses is at a predetermined frequency of a plurality M frequencies, has a predetermined amplitude, and has a predetermined pulse length;

the RF signal generator circuit employs biphasic phase scrambling of sequential pulses such that each pulse has either a first phase or a second phase and the biphasic phase scrambling is pseudo-random;

the RF signal generator circuit incorporates a dual output amplifier wherein a first output of the dual output amplifier has the first phase and a second output of the dual output amplifier has the second phase;

the first output of the dual output amplifier and the second output of the dual output amplifier are coupled to a switch; and the switch selectively selects either the first output of the dual output amplifier with the first phase or the second output of the dual output amplifier with the second phase in dependence upon a pseudo-random control signal coupled to the switch.

12. The transmitter according to claim 11, wherein
the control circuit allows dynamic setting of an emitted power spectrum from the antenna per bit of the plurality of bits.

13. The transmitter according to claim 11, wherein
each sequential pulse of the plurality of N pulses is at a different frequency, amplitude and phase to at least one of an immediately preceding pulse of the plurality of N pulses and an immediately subsequent pulse of the plurality of N pulses;
the control circuit allows dynamic setting of an emitted power spectrum from the antenna per bit of the plurality of bits.

14. The transmitter according to claim 11, wherein
the RF signal generator circuit generates the plurality of N pulses at the predetermined frequencies of the plurality M frequencies without up-conversion.

15. The transmitter according to claim 11, wherein
the RF signal generator circuit generates the plurality of N pulses at the predetermined frequencies of the plurality M frequencies without up-conversion.

16. The transmitter according to claim 11, wherein
the control circuit establishes an output power spectrum without filtering which does not overlap one or more predetermined frequencies associated within one or more predetermined wireless standards.

17. The transmitter according to claim 11, wherein
the control circuit establishes an output power spectrum without filtering which comprises notches at one or more predetermined frequencies associated within one or more predetermined wireless standards.

18. The transmitter according to claim 11, wherein
the control circuit allows dynamic setting of an emitted power spectrum from the antenna per bit of the plurality of bits;
N≥2 and M≥2;
M and N are integers;
a pulse repetition rate of the RF signal generator is determined in dependence of a clock frequency coupled to the RF signal generator;
the integer N depends upon a duration of a bit of the plurality of bits and the pulse repetition rate of the RF signal generator; and
the plurality N pulses are transmitted within the duration of the bit of the plurality of bits.

19. The transmitter according to claim 11, wherein
the RF signal generator comprises at least a pulse generator generating pulses at a pulse repetition rate determined by a clock signal coupled to the pulse generator and a programmable digitally controlled ring oscillator operating over a frequency range covering the plurality M frequencies coupled to an output of the pulse generator;
the RF signal generator operates independent of any mixer and phase locked loop; and
the RF signal generator operates directly independent of any up-conversion of data being transmitted.

20. The transmitter to claim 11, wherein
the control circuit includes a power cycling controller comprising a plurality of non-overlapping signal generation circuits and employs a data signal and a transmit clock to determine when to power up or power down different predetermined portions of the RF signal generator;
each non-overlapping signal generation circuit of the plurality of non-overlapping one of the different predetermined portions of the RF signal generator and generates appropriate control signals to power up or power down that predetermined portion of the RF signal generator; and
the plurality of non-overlapping signal generation circuits are timed to reduce impact on an output signal whilst reducing power consumption of the RF signal generator.

21. A method of transmitting data comprising:
receiving data comprising a plurality of bits to be transmitted;
generating a plurality of wireless signals with a RF signal generator for coupling to an antenna for wireless transmission of the plurality of bits; and
controlling generation of the plurality of wireless signals by the RF signal generator with a control circuit; wherein
the control circuit controls the RF signal generator circuit such that each bit of the plurality of bits is represented by a wireless signal of the plurality of wireless signals;
each wireless signal of the plurality of wireless signals comprises a plurality N pulses generated by the RF signal generator wherein each pulse of the plurality of N pulses is at a predetermined frequency of a plurality M frequencies, has a predetermined amplitude, and has a predetermined pulse length;
the RF signal generator circuit employs biphasic phase scrambling of sequential pulses such that each pulse has either a first phase or a second phase and the biphasic phase scrambling is pseudo-random;

the biphasic phase scrambling is implemented by affecting a startup condition of a digitally controlled ring oscillator within the RF signal generator circuit such that the digitally controlled ring oscillator starts up with either an output having the first phase or an output with the second phase; and the digitally controlled ring oscillator is affected by a pseudo-random control signal.

22. A method of transmitting data comprising:

receiving data comprising a plurality of bits to be transmitted;

generating a plurality of wireless signals with a RF signal generator for coupling to an antenna for wireless transmission of the plurality of bits; and controlling generation of the plurality of wireless signals by the RF signal generator with a control circuit; wherein the control circuit controls the RF signal generator circuit such that each bit of the plurality of bits is represented by a wireless signal of the plurality of wireless signals;

each wireless signal of the plurality of wireless signals comprises a plurality N pulses generated by the RF signal generator wherein each pulse of the plurality of N pulses is at a predetermined frequency of a plurality M frequencies, has a predetermined amplitude, and has a predetermined pulse length;

the control circuit includes a power cycling controller comprising a plurality of non-overlapping signal generation circuits and employs a data signal and a transmit clock to determine when to power up or power down different predetermined portions of the RF signal generator;

each non-overlapping signal generation circuit of the plurality of non-overlapping signal generation circuits is coupled to one of the different predetermined portions of the RF signal generator and generates appropriate control signals to power up or power down that predetermined portion of the RF signal generator; and the plurality of non-overlapping signal generation circuits are timed to reduce impact on an output signal whilst reducing power consumption of the RF signal generator.

23. A transmitter comprising:

an input port for receiving data comprising a plurality of bits to be transmitted;

a RF signal generator for generating a plurality of wireless signals for coupling to an antenna for wireless transmission of the plurality of bits; and a control circuit for controlling generation of the plurality of wireless signals by the RF signal generator; wherein the control circuit controls the RF signal generator circuit such that each bit of the plurality of bits is represented by a wireless signal of the plurality of wireless signals;

each wireless signal of the plurality of wireless signals comprises a plurality N pulses generated by the RF signal generator wherein each pulse of the plurality of N pulses is at a predetermined frequency of a plurality M frequencies, has a predetermined amplitude, and has a predetermined pulse length;

the RF signal generator circuit employs biphasic phase scrambling of sequential pulses such that each pulse has either a first phase or a second phase and the biphasic phase scrambling is pseudo-random;

the biphasic phase scrambling is implemented by affecting a startup condition of a digitally controlled ring oscillator within the RF signal generator circuit such that the digitally controlled ring oscillator starts up with either an output having the first phase or an output with the second phase; and the digitally controlled ring oscillator is affected by a pseudo-random control signal.

24. A transmitter comprising:

an input port for receiving data comprising a plurality of bits to be transmitted;

a RF signal generator for generating a plurality of wireless signals for coupling to an antenna for wireless transmission of the plurality of bits; and a control circuit for controlling generation of the plurality of wireless signals by the RF signal generator; wherein the control circuit controls the RF signal generator circuit such that each bit of the plurality of bits is represented by a wireless signal of the plurality of wireless signals;

each wireless signal of the plurality of wireless signals comprises a plurality N pulses generated by the RF signal generator wherein each pulse of the plurality of N pulses is at a predetermined frequency of a plurality M frequencies, has a predetermined amplitude, and has a predetermined pulse length;

the control circuit includes a power cycling controller comprising a plurality of non-overlapping signal generation circuits and employs a data signal and a transmit clock to determine when to power up or power down different predetermined portions of the RF signal generator;

each non-overlapping signal generation circuit of the plurality of non-overlapping signal generation circuits is coupled to one of the different predetermined portions of the RF signal generator and generates appropriate control signals to power up or power down that predetermined portion of the RF signal generator; and the plurality of non-overlapping signal generation circuits are timed to reduce impact on an output signal whilst reducing power consumption of the RF signal generator.

* * * * *